(12) United States Patent  
Bold et al.

(10) Patent No.: US 8,671,035 B2
(45) Date of Patent: Mar. 11, 2014

(54) PROVIDING PAYROLL SOFTWARE APPLICATION AS ENTERPRISE SERVICES

(75) Inventors: Andreas Bold, Ludwigshafen (DE); Guy Cases-Langhoff, Rauenberg (DE); Fabian Guenther, Mauer (DE); Peter Latocha, Malsch (DE); Philipp Suenderhauf, Leimen (DE)

(73) Assignee: SAP AG, Walldorf (DE)

( * ) Notice: Subject to any disclaimer, the term of this patent is extended or adjusted under 35 U.S.C. 154(b) by 605 days.

(21) Appl. No.: 12/333,085

(22) Filed: Dec. 11, 2008

(65) Prior Publication Data

US 2010/0153240 A1   Jun. 17, 2010

(51) Int. Cl.
  *G07B 17/00*   (2006.01)
(52) U.S. Cl.
  USPC .............................................. 705/30; 705/31
(58) Field of Classification Search
  USPC ...................................................... 705/32, 31
  See application file for complete search history.

(56) References Cited

U.S. PATENT DOCUMENTS

| | | | |
|---|---|---|---|
| 4,947,321 A | 8/1990 | Spence et al. | |
| 5,361,198 A | 11/1994 | Harmon et al. | |
| 5,550,734 A | 8/1996 | Tarter et al. | |
| 5,560,005 A | 9/1996 | Hoover et al. | |
| 5,566,097 A | 10/1996 | Myers et al. | |
| 5,586,312 A | 12/1996 | Johnson et al. | |
| 5,590,277 A | 12/1996 | Fuchs et al. | |
| 5,632,022 A | 5/1997 | Warren et al. | |
| 5,634,127 A | 5/1997 | Cloud et al. | |
| 5,680,619 A | 10/1997 | Gudmundson et al. | |
| 5,704,044 A | 12/1997 | Tarter et al. | |
| 5,710,917 A | 1/1998 | Musa et al. | |
| 5,768,119 A | 6/1998 | Havekost et al. | |
| 5,822,585 A | 10/1998 | Nobel et al. | |
| 5,832,218 A | 11/1998 | Gibbs et al. | |
| 5,848,291 A | 12/1998 | Milne et al. | |
| 5,867,495 A | 2/1999 | Elliott et al. | |
| 5,870,588 A | 2/1999 | Rompaey et al. | |
| 5,881,230 A | 3/1999 | Christensen et al. | |
| 5,893,106 A | 4/1999 | Brobst et al. | |
| 5,898,872 A | 4/1999 | Richley | |
| 5,918,219 A | 6/1999 | Isherwood | |
| 5,987,247 A | 11/1999 | Lau | |
| 5,991,536 A | 11/1999 | Brodsky et al. | |
| H1830 H | 1/2000 | Petrimoulx et al. | |

(Continued)

FOREIGN PATENT DOCUMENTS

| | | |
|---|---|---|
| WO | 00/23874 | 4/2000 |
| WO | WO 2004/083984 | 9/2004 |
| WO | WO 2005/114381 | 12/2005 |

OTHER PUBLICATIONS

Avanquest's Bookkeeper 2007 Provides All-In-One Solution for Small Business Accounting and Financial Management; New Version of Popular Software Enables Detailed REport Creation and In-House Payroll Processing; PR Newswire; New York; Oct. 3, 2006.*

(Continued)

*Primary Examiner* — Elaine Gort
(74) *Attorney, Agent, or Firm* — Fish & Richardson P.C.

(57) ABSTRACT

Methods and apparatus, including systems and computer program products, for a service architecture design that provides enterprise services having payroll functionality at the level of an enterprise application. The design includes a set of service operations, process components, and optionally deployment units. Suitable business objects are also described.

6 Claims, 18 Drawing Sheets

(56) References Cited

U.S. PATENT DOCUMENTS

| | | |
|---|---|---|
| 6,028,997 A | 2/2000 | Leymann et al. |
| 6,038,393 A | 3/2000 | Iyengar et al. |
| 6,049,838 A | 4/2000 | Miller et al. |
| 6,067,559 A | 5/2000 | Allard et al. |
| 6,070,197 A | 5/2000 | Cobb et al. |
| 6,112,024 A | 8/2000 | Almond et al. |
| 6,151,582 A | 11/2000 | Huang et al. |
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,192,390 B1 | 2/2001 | Berger et al. |
| 6,208,345 B1 | 3/2001 | Sheard et al. |
| 6,237,136 B1 | 5/2001 | Sadahiro |
| 6,256,773 B1 | 7/2001 | Bowman-Amuah |
| 6,272,672 B1 | 8/2001 | Conway |
| 6,289,502 B1 | 9/2001 | Garland et al. |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Costanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,640,238 B1 | 10/2003 | Bowman-Amuah |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,757,837 B1 | 6/2004 | Platt et al. |
| 6,764,009 B2 | 7/2004 | Melick et al. |
| 6,772,216 B1 | 8/2004 | Ankireddipally et al. |
| 6,782,536 B2 | 8/2004 | Moore et al. |
| 6,789,252 B1 | 9/2004 | Burke et al. |
| 6,845,499 B2 | 1/2005 | Srivastava et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,898,783 B1 | 5/2005 | Gupta et al. |
| 6,904,399 B2 | 6/2005 | Cooper et al. |
| 6,907,395 B1 | 6/2005 | Hunt et al. |
| 6,950,802 B1 | 9/2005 | Barnes et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,051,071 B2 | 5/2006 | Stewart et al. |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,762 B2 | 7/2006 | Fisher |
| 7,076,766 B2 | 7/2006 | Wirts et al. |
| 7,100,195 B1 | 8/2006 | Underwood |
| 7,103,873 B2 | 9/2006 | Tanner et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,149,887 B2 | 12/2006 | Morrison et al. |
| 7,155,403 B2 | 12/2006 | Cirulli et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,213,232 B1 | 5/2007 | Knowles |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,280,955 B2 | 10/2007 | Martin |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,322,024 B2 | 1/2008 | Carlson et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,401,334 B2 | 7/2008 | Fussell |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,424,701 B2 | 9/2008 | Kendall et al. |
| 7,433,979 B2 | 10/2008 | Need |
| 7,448,022 B1 | 11/2008 | Ram et al. |
| 7,451,432 B2 | 11/2008 | Shukla et al. |
| 7,460,654 B1 | 12/2008 | Jenkins et al. |
| 7,461,030 B2 | 12/2008 | Hibler et al. |
| 7,469,233 B2 | 12/2008 | Shooks et al. |
| 7,493,594 B2 | 2/2009 | Shenfield et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,574,694 B2 | 8/2009 | Mangan et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,653,898 B1 | 1/2010 | Ali et al. |
| 7,657,406 B2 | 2/2010 | Tolone et al. |
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,676,786 B2 | 3/2010 | Shenfield et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,784,025 B2 | 8/2010 | Challapalli et al. |

(56) References Cited

U.S. PATENT DOCUMENTS

| | | |
|---|---|---|
| 7,788,145 B2 | 8/2010 | Wadawadigi et al. |
| 7,788,319 B2 | 8/2010 | Schmidt |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,805,365 B1 | 9/2010 | Slavin et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,006,224 B2 | 8/2011 | Bateman et al. |
| 8,010,938 B2 | 8/2011 | Elaasar |
| 8,051,332 B2 | 11/2011 | Zakonov et al. |
| 8,078,485 B1 | 12/2011 | Kraehmueller et al. |
| 8,086,995 B2 | 12/2011 | Luo et al. |
| 8,091,065 B2 | 1/2012 | Mir et al. |
| 8,112,738 B2 | 2/2012 | Pohl et al. |
| 8,140,455 B2 | 3/2012 | Hutson et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0069144 A1 | 6/2002 | Palardy |
| 2002/0073114 A1 | 6/2002 | Nicastro et al. |
| 2002/0073396 A1 | 6/2002 | Crupi et al. |
| 2002/0078046 A1 | 6/2002 | Uluakar et al. |
| 2002/0082892 A1 | 6/2002 | Raffel et al. |
| 2002/0095650 A1 | 7/2002 | Green et al. |
| 2002/0100014 A1 | 7/2002 | Iborra et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0165745 A1 | 11/2002 | Greene et al. |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0101112 A1 | 5/2003 | Gallagher et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0177342 A1 | 9/2004 | Worley, Jr. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0022160 A1 | 1/2005 | Uluakar et al. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0074150 A1 | 3/2007 | Jolfaei et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1* | 6/2007 | Seubert et al. .............. 705/31 |

(56) References Cited

U.S. PATENT DOCUMENTS

| | | |
|---|---|---|
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0164849 A1 | 7/2007 | Haeberle et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0220143 A1 | 9/2007 | Lund et al. |
| 2007/0233539 A1 | 10/2007 | Suenderhauf et al. |
| 2007/0233541 A1 | 10/2007 | Schorr et al. |
| 2007/0233545 A1 | 10/2007 | Cala et al. |
| 2007/0233574 A1 | 10/2007 | Koegler et al. |
| 2007/0233575 A1 | 10/2007 | Berger et al. |
| 2007/0233581 A1 | 10/2007 | Peter |
| 2007/0233598 A1 | 10/2007 | Der Emde et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265860 A1 | 11/2007 | Herrmann et al. |
| 2007/0265862 A1 | 11/2007 | Freund et al. |
| 2008/0004929 A9 | 1/2008 | Raffel et al. |
| 2008/0010049 A1 | 1/2008 | Pouchak et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2008/0263152 A1 | 10/2008 | Daniels et al. |
| 2008/0300959 A1 | 12/2008 | Sinha et al. |
| 2009/0037287 A1 | 2/2009 | Baitalmal et al. |
| 2009/0037492 A1 | 2/2009 | Baitalmal et al. |
| 2009/0063112 A1 | 3/2009 | Hader et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070331 A1 | 3/2010 | Koegler et al. |
| 2010/0070336 A1 | 3/2010 | Koegler et al. |
| 2010/0070391 A1 | 3/2010 | Storr et al. |
| 2010/0070395 A1 | 3/2010 | Elkeles et al. |
| 2010/0070555 A1 | 3/2010 | Duparc et al. |
| 2010/0100464 A1 | 4/2010 | Ellis et al. |
| 2010/0138269 A1 | 6/2010 | Cirpus et al. |
| 2011/0252395 A1 | 10/2011 | Charisius et al. |

OTHER PUBLICATIONS

Alesky, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Arch-int, S. et al.; "Development of Industrial Information Systems on the Web Using Busienss Components"; Computers in Industry; vol. 60; 2003; pp. 231-250.

Astudillo, H; "How Conceptual System Architecture Leads to Business Process"; ACM; 2000; pp. 35-36.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association international Conlference; 1992; pp. 110-118.

He, J. et al.; "Component-Based Software Engineering: The Need to Link Methods and Their Theories"; Theoretical aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 44-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

(56) References Cited

OTHER PUBLICATIONS

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Searching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.

International Search Report and Wriften Opinion of the International Searching Authority issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Search Report and Written Opinion of the International Searching Authority issued in International Application No. PCT/EP2007/002835; Aug. 9, 2007; 12 pages.

International Preliminary Report on Patentability issued in International Application No. PCT/EP2007/002835; Sep. 30, 2008; 8 pages.

Communication Pursuant to Article 94(3) EPC issued in European Application No. 06841224.6; May 15, 2009; 8 pages.

Communication Pursuant to Article 94(3) EPC issued in European Application No. 06847009.5; May 15, 20O9; 10 pages.

Communication Pursuant to Article 94(3) EPC issued in European Application No. 07007130.3; Dec. 5, 2008; 6 pages.

Extended European Search Report issued in European Application No. 07007130.3; Oct. 5, 2007; 6 pages.

Office Action issued in U.S. Appl. No. 11/323,041; Apr. 30, 2009; 26 pages.

Office Action issued in U.S. Appl. No. 11/322,612; May 11, 2009; 24 pages.

Office Action issued in U.S. Appl. No. 11/322,772; Mar. 25, 2009; 12 pages.

Office Action issued in U.S. Appl. No. 11/323,590; Jan. 9, 2009; 23 pages.

Office Action issued in U.S. Appl. No. 11/396,288; Jan. 2, 2009; 18 pages.

Office Action issued in U.S. Appl. No. 11/396,288; Apr. 15, 2008; 26 pages.

Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.

Anon.; "State of the Art Reports™ 13,000 MAS 90® for WINDOWS® Shipments in First Nine Months of Availability"; PR Newswire; Apr. 28, 1997.

Avery, S.; "Buyer's Guide to Software for Purchasing 2000.(Directory)"; Purchasing, vol. 129, No. 1; p. 179; Jul. 13, 2000.

"Hudson's Bay Company Realizes Fast ROI with the Oracle E-Business Suite"; PR Newswire; New York; Jan. 15, 2002; p. 1.

Office Action issued in U.S. Appl. No. 11/397,029; Jul. 21, 2009;28 pages.

Office Action issued in U.S. Appl. No. 11/323 040; Jul. 24, 2009; 35 pages.

Office Action issued in U.S. Appl. No. 11/323,590; Jul. 10, 2009; 32 pages.

Office Action issued in U.S. Appl. No. 11/322,816; Jul. 23, 2006; 41 pages.

Office Action issued in U.S. Appl. No. 11/322,851; Sep. 2, 2009; 9; 32 pages.

Office Action issued in U.S. Appl. No. 11/323,590; Dec. 30, 2009; 31 pages.

Office Action issued in U.S. Appl. No. 11/322,482; Jan. 7, 2010; 19 pages.

Office Action issued in U.S. Appl. No. 11/322,772; Dec. 9, 2009; 14 pages.

Office Action issued in U.S. Appl. No. 11/323,039; Sep. 4, 2009; 36 pages.

Office Action issued in U.S. Appl. No. 11/323,634; Sep. 10, 2009: 15 pages.

Office Action issued in U.S. Appl. No. 11/322,383; Nov. 12, 2009; 29 pages.

Office Action issued in U.S. Appl. No. 11/396,258; Nov. 25, 2009: 9 pages.

Office Action issued in U.S. Appl. No. 11/396,288; Aug. 19, 2009; 20 pages.

"American Software Announces ASP Pricing Model for It's a-Applications Expense Business Solution"; PR Newswire; Mar. 6, 2000; 2 pages.

Bastani et al.; "Complex Open System Design by Quasi Agents: Process Oriented Modeling in Agent Based Systems"; ACM SIGSOFT; vol. 34, No. 4; 2009; 1-14.

Bastani el al.; "Process Oriented Abstraction of the Complex Evolvable Systems: Problem Model Construction"; ACM SIGSOFT; vol. 33, No. 3; 2008; pp. 1-13.

"Cendant Announces Comprehensive Online Travel Booking to Meet President Bush's eTravel Initiative"; PR Newswire; Jul. 9, 2002; 3 pages.

Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.

Duc et al.; "Uniform Object Modeling Methodology and Reuse of Real Time System Using UML"; EMSOFT '05; Sep. 19-22, 2005; pp. 44-47.

Gomaa et al.; "Model Based Software Design and Adaption"; International Workshop on Software Engineering for Adaptive and Self-Managing Systems (SEAMS '07); IEEE; 2007; 10 pages.

Huang, S. et al.; "Computer-Assisted Supply Chain Configuration Based on Supply Chain Operations Reference (SCOR) Model"; Computers & Industrial Engineering 48; 2005; pp. 377-394.

Intuit Canada Ltd.; "Startup Guide—QuickBooks Basic for Windows, QuickBooks Pro for Windows, QuickBooks Premier for Windows"; 2002; 230 pages.

Lambert et al.; "Supply Chain Metrics"; International Journal of Logistics Management; vol. 12, No, 1; 2001; pp. 1-19.

(56) References Cited

OTHER PUBLICATIONS

Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org->; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter 1 issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,398 on Apr. 2, 2010; 39 pages.
Office Action issued in U.S. Appl. No. 11/322,383; May 12, 2010; 23 pages.
Office Action issud in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Notice of Allowance issued in U.S. Appl. No. 11/397,026 on Mar. 29, 2010; 17 pages.
Notice of Allowance issued in U.S. Appl. No. 12/233,554 on May 14, 2010; 11 pages.
Notice of Allowance issued in U.S. Appl. No. 11/967,865 on Mar. 31, 2010; 16 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Bin et al.; "Component Model Optimization for Distributed Real-Time Embedded Software"; IEEE International Conference on Systems, Man and Cybernetics; Oct. 13, 2004; 6 pages.
Cascallar, Eduardo et al.; "Assessment in the Evaluation of Self-Regulation as a Process"; Educational Psychology Review; vol. 18, No. 3; Sep. 2006; pp. 297-306.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cool, David W.; "Activity Fund Accounting"; School Business Affairs; vol. 49, No. 6; Jun. 1983; pp. 50-52.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463, <http://portal.acm.org/citation.cfm?id=191322>.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Jennings et al.; "Autonomous Agents for Business Process Management"; 2000 Applied Artificial Intelligence; retrieved on Jul. 25, 2011; pp. 145-189, <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Orsburn; "Spares Management Handbook"; McGraw Hill; 1991; ISBN: 0-8306-7626-0.
Papazoglou et al; "Service-Oriented Computing Research Road Map"; http://infolab.nvt.al/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; 2004; pp. 1-208.
SAP AG; "Powered by SAP NetWeaver Partner Program—Frequently Asked Questions"; May 2005; 10 pages [online] http://www.lionbridge.com/NR/rdonlyres/4940BEIF/DA46/412E/AB16/F049BD865CA1/0/PBMWFAQ_50070686_en.pdf.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,236 on Oct. 28, 2010; 19 pages.
Notice of Allowance issued in U.S. Appl. No. 12/233,554 on Sep. 17, 2010; 10 pages.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.

(56) References Cited

OTHER PUBLICATIONS

Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634 on Apr. 29, 2011; 8 pages.
Office Action issued in U.S. Appl. No. 11/322,973 on Dec. 7, 2010; 13 pages.
Office Action issued in U.S. Appl. No. 11/322,973 on May 27, 2011; 15 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Office Action issued in U.S. Appl. No. 11/404,147 on Aug. 4, 2011; 26 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 11/967,483 on Aug. 20, 2010; 10 pages.
Office Action issued in U.S. Appl. No. 11/967,483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowance issued in U.S. Appl. No. 12/333,085; Sep. 13, 2010; 8 pages.
Office Action issued in U.S. Appl. No. 12/233,087 on Aug. 18, 2011; 42 pages.
Office Action issued in U.S. Appl. No. 11/396,312 on Sep. 10, 2010; 23 pages.
Office Action issued in U.S. Appl. No. 11/322,677 on Sep. 16, 2010; 21 pages.
Office Action issued in U.S. Appl. No. 11/322,772; Jul. 12, 2010; 18 pages.
Advisory Action issued in U.S. Appl. No. 11/322,612; Jun. 24, 2010; 3 pages.
Notice of Allowance issued in U.S. Appl. No. 12/233,534 on Jun. 24, 2010; 15 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/233,534 on May 16, 2011; 12 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowance issued in U.S. Appl. No. 11/322,398 on Jul. 23, 2010; 38 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Notice of Allowance issued in U.S. Appl. No. 11/396,259 on Jul. 6, 2010; 6 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Office Action issued in U.S. Appl. No. 11/322,845; Jul. 15, 2010; 16 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Sep. 16, 2010; 16 pages.
Office Action issued in U.S. Appl. No. 12/233,557 on Mar. 4, 2011; 19 pages.

(56) References Cited

OTHER PUBLICATIONS

Office Action issued in U.S. Appl. No. 12/233,489 on May. 13, 2011; 15 pages.
Office Action issued in U.S. Appl. No. 11/967,393 o n Apr. 15, 2011; 12 pages.
Notice of Allowance issued in U.S. Appl. No. 12/327,354 on Jun. 25, 2010; 16 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Cool, David W.; "Activity Fund Accounting", School Business Affairs; vol. 49, No. 6; Jun. 1983; pp. 50-52.
SAP AG; "SAP NetWeaver Visual Composer: User Guide (SAP NetWeaver Visual Composer release 6.0)"; Document version 1.1; pp. 1-208.
Office Action issued in U.S. Appl. No. 11/322,611 on Sep. 16, 2010; 21 pages.
Office Action issued in U.S. Appl. No. 11/322,772 on Jul. 12, 2010; 18 pages.
Notice of Allowance issued in U.S. Appl. No. 11/322,398 on Nov. 15, 2010; 20 pages.
Notice of Allowance issued in U.S. Application No. 1/322,382 on Sep. 20, 2010; 6 pages.
Notice of Allowance issued in U.S. Appl. No. 11/968,054 on Sep. 7, 2010; 11 pages.
Office Action issued in U.S. Appl. No. 11/967,483; Aug. 20, 2010; 10 pages.
Anonymous; "Mastering Management"; Motor Age, vol. 25, No. 10; Oct. 2006; pp. 1-3.
Business Editors/Technology Writers; "CrossWorlds Software Announces J2EE Interoperability with Open Standards Interface"; Business Wire, 1; Nov. 20; Retrieved on Jun. 12, 2012.
Gerin et al.; "Flexible and Executable Hardware/Software Interface Modeling for Multiprocessor SOC Design Using System C"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
"IDe Partners with Journyx to Offer Customers Best-in-Class Time Management Solution"; PR Newswire; Mar. 8, 2005; Business Dateline.
Kagermann, Prof. Dr. Henning & Dr. Peter Zencke; "Plug-and-Play Vision Nears Reality with BPM"; Business Times; Sep. 8, 2005; p. 9.
Kloppmann et al.; "Business Process Choreography in WebSphere: Combining the Power of BPEL and J2EE"; IBM Systems Journal; 2004.
Kremic, Tibor; "Outsourcing Decision Support: A Survey of Benefits, Risks, and Decision Factor"; Supply Chain Management; V. 11; 2006; pp. 467-482.
Mani et al.; "Towards Information Networks to Support Composable Manufacturing"; PerMIS 2008.
Meseroll, Robert; "Data Mining Navy Flight"; IEEE Autotestcom 2007; Sep. 2007; pp. 476-481.
Molina et al.; "Resuable Knowledge Based Components for Building Software Applications: A Knowledged Modeling Approach"; International Journal of Software Engineering and Knowledge Engineering; vol. 9, No. 3; 1999; pp. 297-317.
Sarjoughian et al.; "CoSMOs: A Visual Environment for Component Based Modeling, Experimental Design and Simulation"; ASM; 2009; pp. 1-9.
"SAP NetWeaver Empowers IT to Drive Innovation into Business Processes across the Enterprise"; Canada NewsWire, 1; May 13; Retrieved on Jun. 12, 2012.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35, 3-4:385-93.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Zeng et al.; "Model Analysis for Business Event Processing"; IBM Systems Journal 2007.
Zimmermann et al.; "Service-Oriented Architecture and Business Process Choreography in an Order Management Scenario: Rationale, Concepts, Lessons Learned"; OOPLA 2005.
Examiner's Answer to Appeal Brief issued in U.S. Appl. No. 11/396,236 on Nov. 10, 2011; 19 pages.
Notice of Allowance in U.S. Appl. No. 12/233,462 on Apr. 5, 2012; 7 pages.
Notice of Allowance in U.S. Appl. No. 12/233,462 on Dec. 12, 2011; 6 pages.
Notice of Allowance issued in U.S. Appl. No. 11/322,382 on May 21, 2012; 5 pages.
Notice of Allowance issued in U.S. Appl. No. 11/322,383 on May 21, 2012; 14 pages.
Notice of Allowance issued in U.S. Appl. No. 11/322,845; Nov. 13, 2011; 9 pages.
Notice of Allowance issued in U.S. Appl. No. 11/322,851 on Mar. 1, 2012; 9 pages.
Notice of Allowance issued in U.S. Appl. No. 11/323,039 on Jun. 7, 2012; 9 pages.
Notice of Allowance issued in U.S. Appl. No. 11/323,040 on Jun. 8, 2012; 9 pages.
Notice of Allowance issued in U.S. Appl. No. 11/323,634 on Jan. 25, 2012; 5 pages.
Notice of Allowance issued in U.S. Appl. No. 11/396,250 on Dec. 7, 2011; 6 pages.
Notice of Allowance issued in U.S. Appl. No. 11/396,250 on Jul. 10, 2012; 6 pages.
Notice of Allowance issued in U.S. Appl. No. 11/396,258 on Feb. 3, 2012; 12 pages.
Notice of Allowance issued in U.S. Appl. No. 11/396,259 on Mar. 15, 2012; 7 pages.
Notice of Allowance issued in U.S. Appl. No. 11/396,288; Apr. 27, 2012; 15 pages.
Notice of Allowance issued in U.S. Appl. No. 11/396,327 on Jun. 20, 2012; 29 pages.
Notice of Allowance issued in U.S. Appl. No. 11/396,327 on Sep. 28, 2011; 31 pages.
Notice of Allowance issued in U.S. Appl. No. 11/397,026 on Feb. 23, 2012; 8 pages.
Notice of Allowance issued in U.S. Appl. No. 11/397,026 on Nov. 4, 2011; 8 pages.
Notice of Allowance issued in U.S. Appl. No. 11/404,147 on Jul. 5, 2012; 17 pages.
Notice of Allowance issued in U.S. Appl. No. 11/967,393 on Nov. 9, 2011; 9 pages.
Notice of Allowance issued in U.S. Appl. No. 12/233,075 on Mar. 22, 2012; 25 pages.

(56) References Cited

OTHER PUBLICATIONS

Notice of Allowance issued in U.S. Appl. No. 12/233,087 on Mar. 30, 2012; 30 pages.
Notice of Allowance issued in U.S. Appl. No. 12/233,289 on Feb. 15, 2012; 11 pages.
Notice of Allowance issued in U.S. Appl. No. 12/233,417 on Jul. 27, 2012; 10 pages.
Notice of Allowance issued in U.S. Appl. No. 12/233,457 on May 16, 2012; 7 pages.
Notice of Allowance issued in U.S. Appl. No. 12/233,457 on Nov. 3, 2011; 12 pages.
Notice of Allowance issued in U.S. Appl. No. 12/233,458 on May 1, 2012; 17 pages.
Notice of Allowance issued in U.S. Appl. No. 12/233,520 on Nov. 10, 2011; 22 pages.
Notice of Allowance issued in U.S. Appl. No. 12/233,534 won Dec. 28, 2011; 7 pages.
Notice of Allowance issued in U.S. Appl. No. 12/233,534 won Jul. 18, 2012; 16 pages.
Notice of Allowance issued in U.S. Appl. No. 12/233,550 on Jan. 9, 2012; 11 pages.
Notice of Allowance issued in U.S. Appl. No. 12/327,232 on Jun. 6, 2012; 7 pages.
Notice of Allowance issued in U.S. Appl. No. 12/327,232 on Nov. 2, 2011; 16 pages.
Notice of Allowance issued in U.S. Appl. No. 12/327,354 on Jul. 25, 2012; 17 pages.
Notice of Allowance issued in U.S. Appl. No. 12/327,590 on Dec. 28, 2011; 10 pages.
Notice of Allowance issued in U.S. Appl. No. 12/327,590 on Jul. 19, 2012; 11 pages.
Notice of Allowance issued in U.S. Appl. No. 12/327,701 on Apr. 6, 2012; 9 pages.
Notice of Allowance issued in U.S. Appl. No. 12/327,737 on Jul. 10, 2012; 7 pages.
Notice of Allowance issued in U.S. Appl. No. 12/332,965 on Jun. 11, 2012; 21 pages.
Notice of Allowanced issued in U.S. Appl. No. 11/322,398 on May 3, 2012; 7 pages.
Notice of Allowanced issued in U.S. Appl. No. 11/322,398 on Oct. 18, 2011; 7 pages.
Office Action issued in U.S. Appl. No. 11/322,482; Aug. 21, 2012; 27 pages.
Office Action issued in U.S. Appl. No. 11/322,612 on Jun. 26, 2012; 11 pages.
Office Action issued in U.S. Appl. No. 11/322,816 on Jun. 7, 2012; 12 pages.
Office Action issued in U.S. Appl. No. 11/323,041 on Jun. 7, 2012; 12 pages.
Office Action issued in U.S. Appl. No. 11/396,252 on Nov. 10, 2011; 18 pages.
Office Action issued in U.S. Appl. No. 11/396,288 on Oct. 17, 2011; 38 pages.
Office Action issued in U.S. Appl. No. 11/967,387 on Apr. 12, 2012; 13 pages.
Office Action issued in U.S. Appl. No. 11/967,489 on Feb. 6, 2012; 9 pages.
Office Action issued in U.S. Appl. No. 11/967,489 on Sep. 28, 2011; 7 pages.
Office Action issued in U.S. Appl. No. 12/233,289 on Oct. 27, 2011; 15 pages.
Office Action issued in U.S. Appl. No. 12/233,458 on Oct. 12, 2011; 19 pages.
Office Action issued in U.S. Appl. No. 12/233,479 on May 7, 2012; 26 pages.
Office Action issued in U.S. Appl. No. 12/233,479 on Oct. 27, 2011; 24 pages.
Office Action issued in U.S. Appl. No. 12/233,489 on Jun. 6, 2012; 87 pages.
Office Action issued in U.S. Appl. No. 12/327,701 on Nov. 8, 2011; 20 pages.
Office Action issued in U.S. Appl. No. 12/327,737 on Mar. 26, 2012; 14 pages.
Office Action issued in U.S. Appl. No. 12/332,965 on Oct. 11, 2011; 6 pages.
Office Action issued in U.S. Appl. No. 12/333,146 on Feb. 2, 2012; 21 pages.
Office Action issued in U.S. Appl. No. 13/413,069 on Aug. 1, 2012; 45 pages.

\* cited by examiner

PROVIDING PAYROLL SOFTWARE APPLICATION AS ENTERPRISE SERVICES

BACKGROUND

This specification relates to data processing systems implemented on computers and, more particularly, to data processing systems providing services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standard-based way of encapsulating the functionality of an application that other applications can locate and access. A service-oriented architecture is a distributed software model within which all functionality is defined as independent web services. Within a service-oriented architecture, web services can be used in defined sequences according to the business logic to form applications that enable business processes.

SUMMARY

This specification describes a services architecture design that provides enterprise services having payroll functionality at the level of an enterprise application. Enterprise services are web services that have an enterprise-level business value.

In its various aspects, the services architecture design can be embodied in systems, methods, and computer program products. For example, a system in one embodiment implements a services architecture design that provides enterprise services having payroll functionality at the level of an enterprise application. The design includes a set of service operations, process components, and optionally deployment units. Suitable business objects are also described.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1:
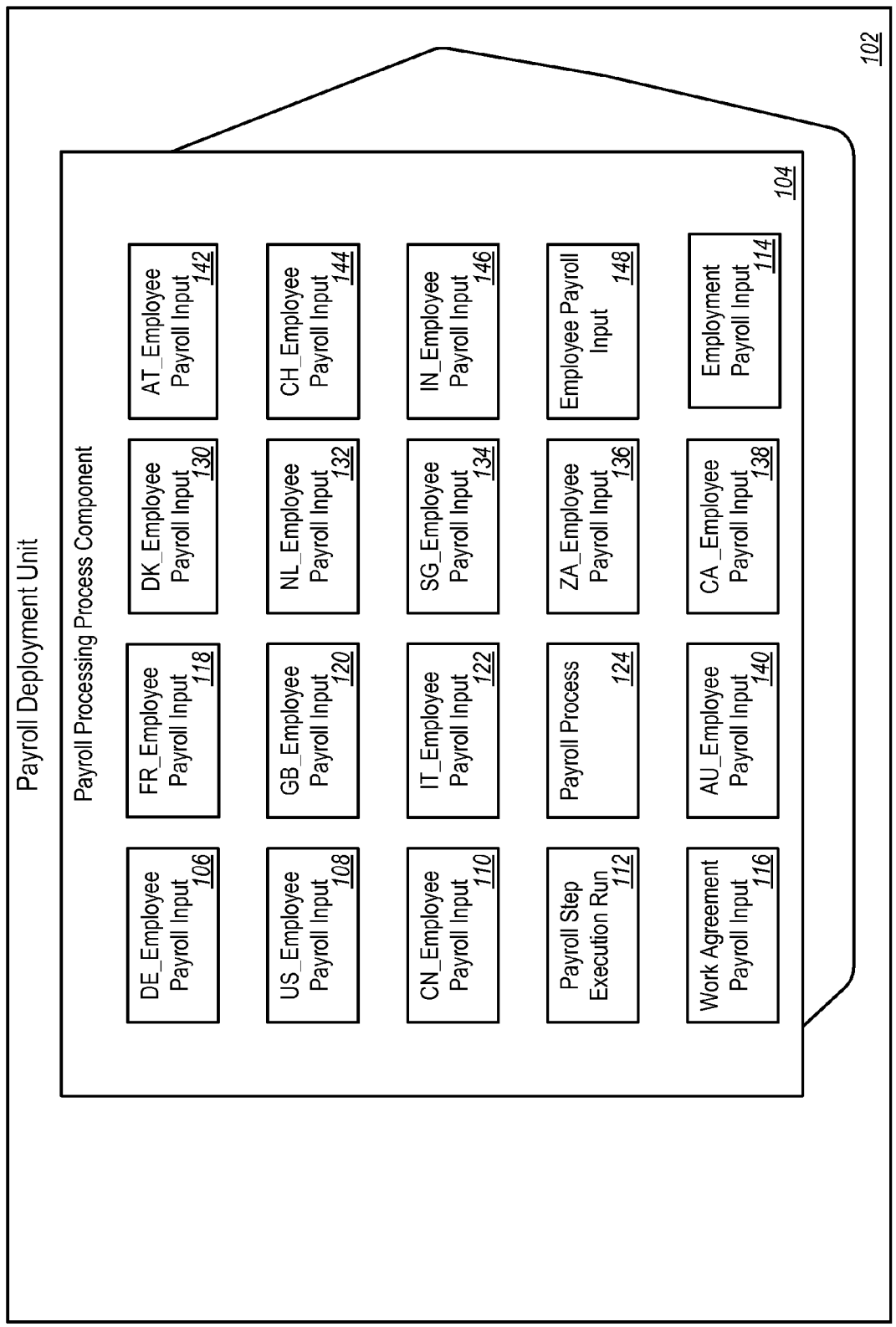
FIG. 1 illustrates a high-level view of a software architectural design and implementation of a suite enterprise software services having payroll functionality.

FIG. 1 illustrates a high-level view of a software architectural design and of an application software implementation that provides a suite of enterprise service operations, which can be organized into interfaces, having payroll application functionality. The software corresponding to FIG. 1 in one implementation is for deployment in an application layer of an application server.

The elements of the architecture include the business object, the process component, the service operation (or simply, the operation), the service interface, the message, and the deployment unit. The elements can also include process agents and reuse service components. These will be generally described below.

In one implementation, the software is implemented to be deployed on an application platform that includes a foundation layer that contains all fundamental entities that can be used from multiple deployment units. These entities can be process components, business objects or reuse service components. A reuse service component is a piece of software that is reused in different transactions. A reuse service component is used by its defined interfaces, which can be, e.g., local APIs (Application Programming Interfaces) or service interfaces.

The architectural design is a specification of a computer software application, and elements of the architectural design can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects. A business object represents a specific view on some well-defined business content. A business object represents content, and instances of business objects include content, which a typical business user would expect and understand with little explanation. Whether an object as a type or an instance of an object is intended by the term is generally clear from the context, so the distinction will be made explicitly only when necessary. Properly implemented, business objects are implemented free of redundancies.

Business objects are further categorized as business process objects and master data objects. A business object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run. An instance of a mass data run object contains a particular set of selections and parameters. A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of anon-dependent business object. A transformed object is a transformation of multiple business objects for a well-defined purpose. It transforms the structure of multiple business objects into a common structure. A transformed object does not have its own persistency.

The architectural elements also include the process component. A process component is a software package that realizes a business process and generally exposes its functionality as services. The functionality contains business transactions. A process component contains one or more semantically related business objects. Any business object belongs to no more than one process component. Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them serving as a signature. For convenience in supporting use of the operations supported by a system implementing elements of the design, such a system can optionally include a repository of service descriptions that includes a standards-based description of each of the supported service operations.

The architectural elements also include the service interface, which may be referred to simply as an interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous. Asynchronous outbound process agents are called after a business object changes, e.g., after a create, update, or delete of a business object instance. Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, which are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are preferably assigned to their respective deployment unit.

FIG. 1 illustrates a high-level view of a software architectural design and implementation of a suite enterprise software services having payroll functionality.

As shown in FIG. 1, a Payroll deployment unit 102 includes a Payroll Processing process component 104, a DE_Employee Payroll Input business object 106, a US_Employee Payroll Input business object 108, a CN_Employee Payroll Input business object 110, a Payroll Step Execution Run business object 112, an Employment Payroll Input business object 114, a Work Agreement Payroll Input business object 116, an FR_Employee Payroll Input business object 118, a GB_Employee Payroll Input business object 120, an IT_Employee Payroll Input business object 122, a Payroll Process business object 124, a DK_Employee Payroll Input business object 130, an NL_Employee Payroll Input business object 132, an SG_Employee Payroll Input business object 134, a ZA_Employee Payroll Input business object 136, a CA_Employee Payroll Input business object 138, an AU_Employee Payroll Input business object 140, an AT_Employee Payroll Input business object 142, a CH_Employee Payroll Input business object 144, an IN_Employee Payroll Input business object 146, and an Employee Payroll Input business object 148.

FIGS. 2A, 2B, 2C, 2D, 2E, 2F, 2G, 2H, 2I, 2J, 2K, 2L, 2M, 2N, 2O, 2P, and 2Q are block diagrams collectively showing the Payroll Processing process component 104 (FIG. 1). For convenience in describing this process component, a number of other process components are shown in the figures; these other process components are not part of the process component being described. These other process components are a Compensation Management process component 202, a Time and Labor Management process component 203, an Employee Payroll Administration process component 204, an Expense and Reimbursement Management process component 205, a DE_Employer Regulatory Compliance process component 206, a Payroll Processing at Provider process component 207, a US_Employer Regulatory Compliance process component 208, a CN_Employer Regulatory Compliance process component 209, an FR_Employer Regulatory Compliance process component 210, a GB_Employer Regulatory Compliance process component 211, an IT_Employer Regulatory Compliance process component 212, an AU_Employer Regulatory Compliance process component 213, a CA_Employer Regulatory Compliance process component 214, a DK_Employer Regulatory Compliance process component 215, an NL_Employer Regulatory Compliance process component 216, an SG_Employer Regulatory Compliance process component 217, a ZA_Employer Regulatory Compliance process component 218, an AT_Employer Regulatory Compliance process component 209b, a CH_Employer Regulatory Compliance process component 237b, and an IN_Employer Regulatory Compliance process component 223b. These other process components are used to represent software external to the process component in describing its interactions with the external software; however, while the external software can be implemented as such process components, this is not required.

Figure 2A:
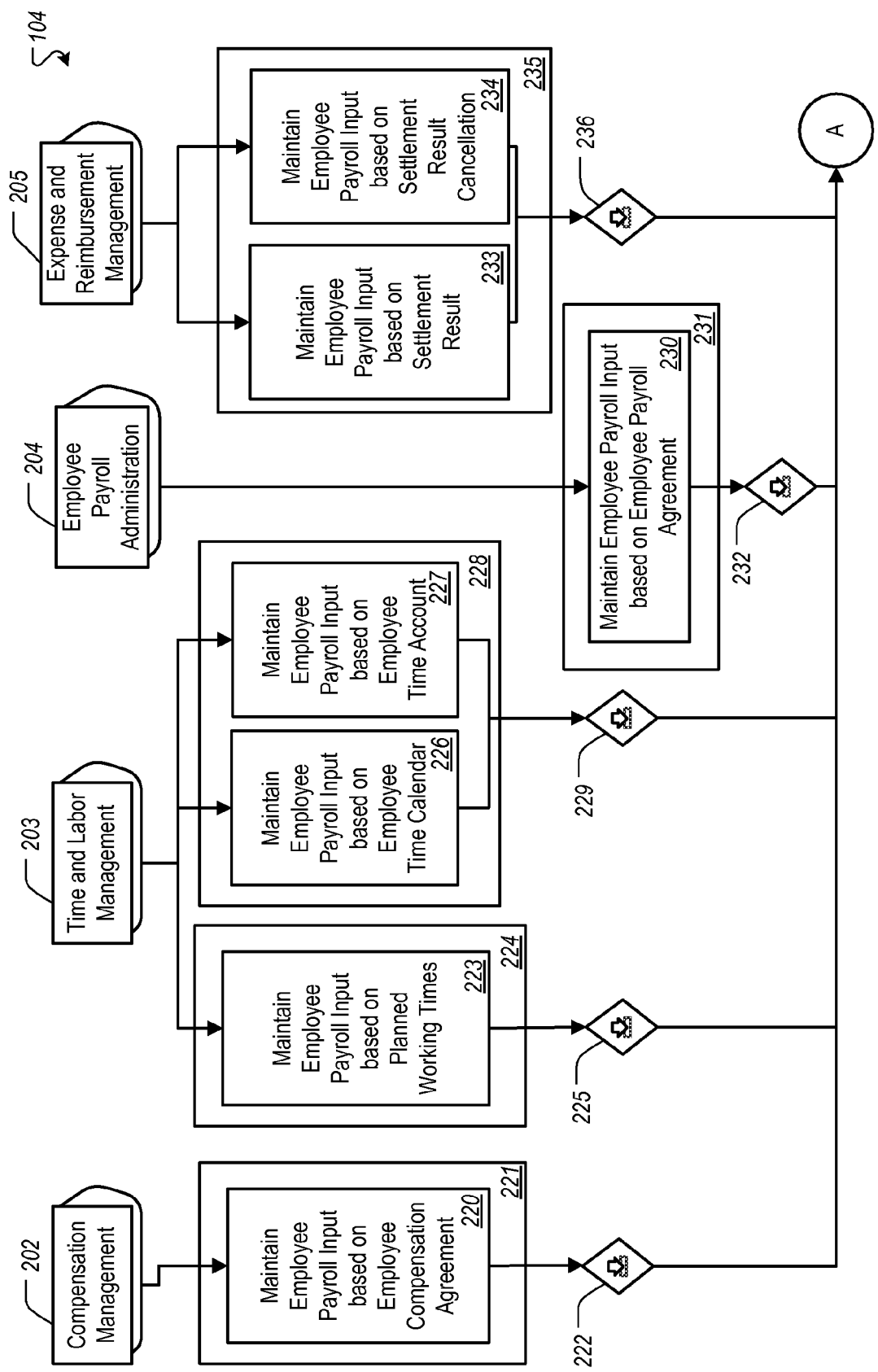
FIGS. 2A, 2B, 2C, 2D, 2E, 2F, 2G, 2H, 2I, 2J, 2K, 2L, 2M, 2N, 2O, 2P, and 2Q are block diagrams collectively showing a payroll processing process component.
Figure 2B:
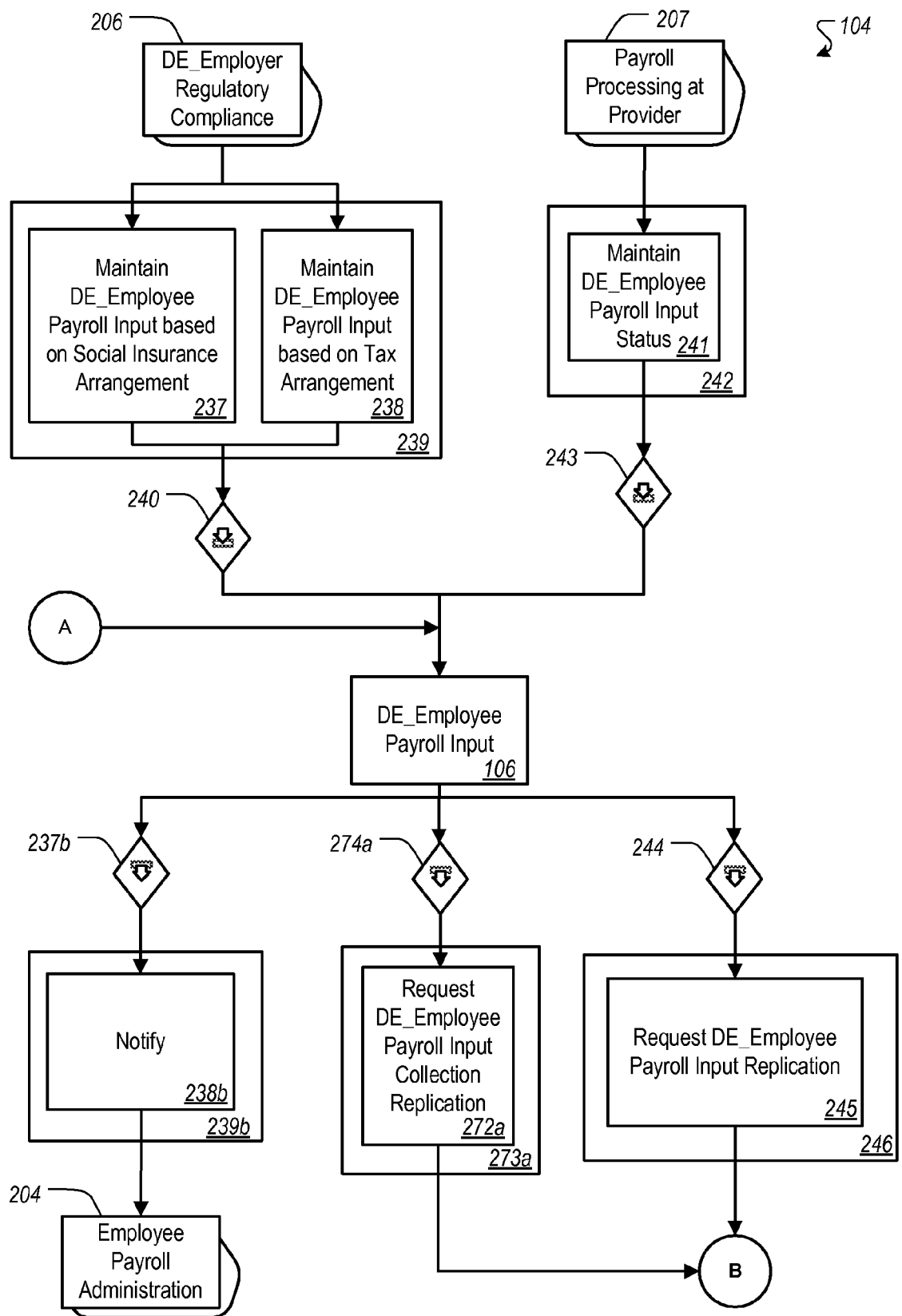

A Maintain Employee Payroll Input based on Employee Compensation Agreement operation 220 can send a notification to maintain information on an employee's compensation agreement using a Maintain Employee Payroll Input based on Employee Compensation Agreement asynchronous inbound process agent 222 to update one or more business objects, such as the DE_Employee Payroll Input business object 106 (FIG. 2B). For example, the operation 220 can send a notification to update the DE_Employee Payroll Input business object 106 if input is received from the Compensation Management process component 202. The Maintain Employee Payroll Input based on Employee Compensation Agreement operation 220 is included in an Employee Compensation Agreement in Payroll Input Maintenance In interface 221.

A Maintain Employee Payroll Input based on Planned Working Times operation 223 can send a notification to maintain information on an employee's planned working times using a Maintain Employee Payroll Input based on Planned Working Times asynchronous inbound process agent 225 to update one or more business objects, such as the DE_Employee Payroll Input business object 106 (FIG. 2B). For example, the operation 223 can send a notification to update the DE_Employee Payroll Input business object 106 if input is received from the Time and Labor Management process component 203. The Maintain Employee Payroll Input based on Planned Working Times operation 223 is included in an Employee Time Agreement in Payroll Input Maintenance In interface 224.

A Maintain Employee Payroll Input based on Employee Time Calendar operation 226 can send a notification to maintain information on an employee's time calendar agreement using a Maintain Employee Payroll Input based on Employee Time Calendar or Account asynchronous inbound process agent 229 to update one or more business objects, such as the DE_Employee Payroll Input business object 106 (FIG. 2B). For example, the operation 226 can send a notification to update the DE_Employee Payroll Input business object 106 if input is received from the Time and Labor Management process component 203.

A Maintain Employee Payroll Input based on Employee Time Account operation 227 can send a notification to maintain information on an employee's time account using the Maintain Employee Payroll Input based on Employee Time Calendar or Account asynchronous inbound process agent 229 to update one or more business objects, such as the DE_Employee Payroll Input business object 106 (FIG. 2B). For example, the operation 227 can send a notification to update the DE_Employee Payroll Input business object 106 if input is received from the Time and Labor Management process component 203. The Maintain Employee Payroll Input based on Employee Time Calendar operation 226 and the Maintain Employee Payroll Input based on Employee Time Account operation 227 are included in an Employee Time Calendar and Account in Payroll Input Maintenance In interface 228.

A Maintain Employee Payroll Input based on Employee Payroll Agreement operation 230 can send a notification to maintain information on an employee's payroll using a Maintain Employee Payroll Input based on Employee Payroll Agreement asynchronous inbound process agent 232 to update one or more business objects, such as the DE_Employee Payroll Input business object 106 (FIG. 2B). For example, the operation 230 can send a notification to update the DE_Employee Payroll Input business object 106 if input is received from the Employee Payroll Administration process component 204. The Maintain Employee Payroll Input based on Employee Payroll Agreement operation 230 is included in an Employee Payroll Agreement in Payroll Input Maintenance In interface 231.

A Maintain Employee Payroll Input based on Settlement Result operation 233 can send a notification to maintain information on a settlement result using a Maintain Employee Payroll Input based on Expense Report Settlement Result asynchronous inbound process agent 236 to update one or more business objects, such as the DE_Employee Payroll Input business object 106 (FIG. 2B). For example, the operation 233 can send a notification to update the DE_Employee Payroll Input business object 106 if input is received from the Expense and Reimbursement Management process component 205.

A Maintain Employee Payroll Input based on Settlement Result Cancellation operation 234 can send a notification to maintain information on settlement result cancellation using the Maintain Employee Payroll Input based on Expense Report Settlement Result asynchronous inbound process agent 236 to update one or more business objects, such as the DE_Employee Payroll Input business object 106 (FIG. 2B). For example, the operation 234 can send a notification to update the DE_Employee Payroll Input business object 106 if input is received from the Expense and Reimbursement Management process component 205. The Maintain Employee Payroll Input based on Settlement Result operation 233 and the Maintain Employee Payroll Input based on Settlement Result Cancellation operation 234 are included in an Expense Report in Payroll Input Maintenance In interface 235.

A Maintain DE_Employee Payroll Input based on Social Insurance Arrangement operation 237 (FIG. 2B) can send a notification to maintain information on an employee's German social insurance arrangement using a Maintain DE_Employee Payroll Input based on Employer Regulatory Compliance asynchronous inbound process agent 240 to update the DE_Employee Payroll Input business object 106. For example, the operation 237 can send a notification to update the DE_Employee Payroll Input business object 106 if input is received from the DE_Employer Regulatory Compliance process component 206.

A Maintain DE_Employee Payroll Input based on Tax Arrangement operation 238 can send a notification to maintain information on an employee's German tax arrangement using the Maintain DE_Employee Payroll Input based on Employer Regulatory Compliance asynchronous inbound process agent 240 to update the DE_Employee Payroll Input business object 106. For example, the operation 238 can send a notification to update the DE_Employee Payroll Input business object 106 if input is received from the DE_Employer Regulatory Compliance process component 206. The Maintain DE_Employee Payroll Input based on Social Insurance Arrangement operation 237 and the Maintain DE_Employee Payroll Input based on Tax Arrangement operation 238 are included in a DE_Employer Regulatory Compliance in Payroll Input Maintenance In interface 239.

A Maintain DE_Employee Payroll Input Status operation 241 can send a notification to maintain information on the status of the DE_Employee Payroll Input business object 106 using a Maintain DE_Employee Payroll Input Status based on Replication Confirmation asynchronous inbound process agent 243 to update the DE_Employee Payroll Input business object 106. For example, the operation 241 can send a notification to update the DE_Employee Payroll Input business object 106 if input is received from the Payroll Processing at Provider process component 207. The Maintain DE_Employee Payroll Input Status operation 241 is included in a DE_Employee Payroll Input Replication In interface 242.

The DE_Employee Payroll Input business object 106 can receive updated information and send the update into other components to perform further operations. As shown in FIG. 2B, outbound process agents can receive information from the DE_Employee Payroll Input business object 106. The DE_Employee Payroll Input business object 106 can be a summary of all employee-specific input for German payroll for one employee.

A Notify of DE_Employee Payroll Input Provider Details to Employee Payroll Administration asynchronous outbound process agent 237*b* can invoke a Notify operation 238*b*. For example, the outbound process agent 237*b* can notify the Employee Payroll Administration process component 204 of additions or changes to information about the DE_Employee Payroll Input business object 106. The Notify operation 238*b* is included in a DE_Payroll Input Provider Details Notification Out interface 239*b*.

Figure 2C:
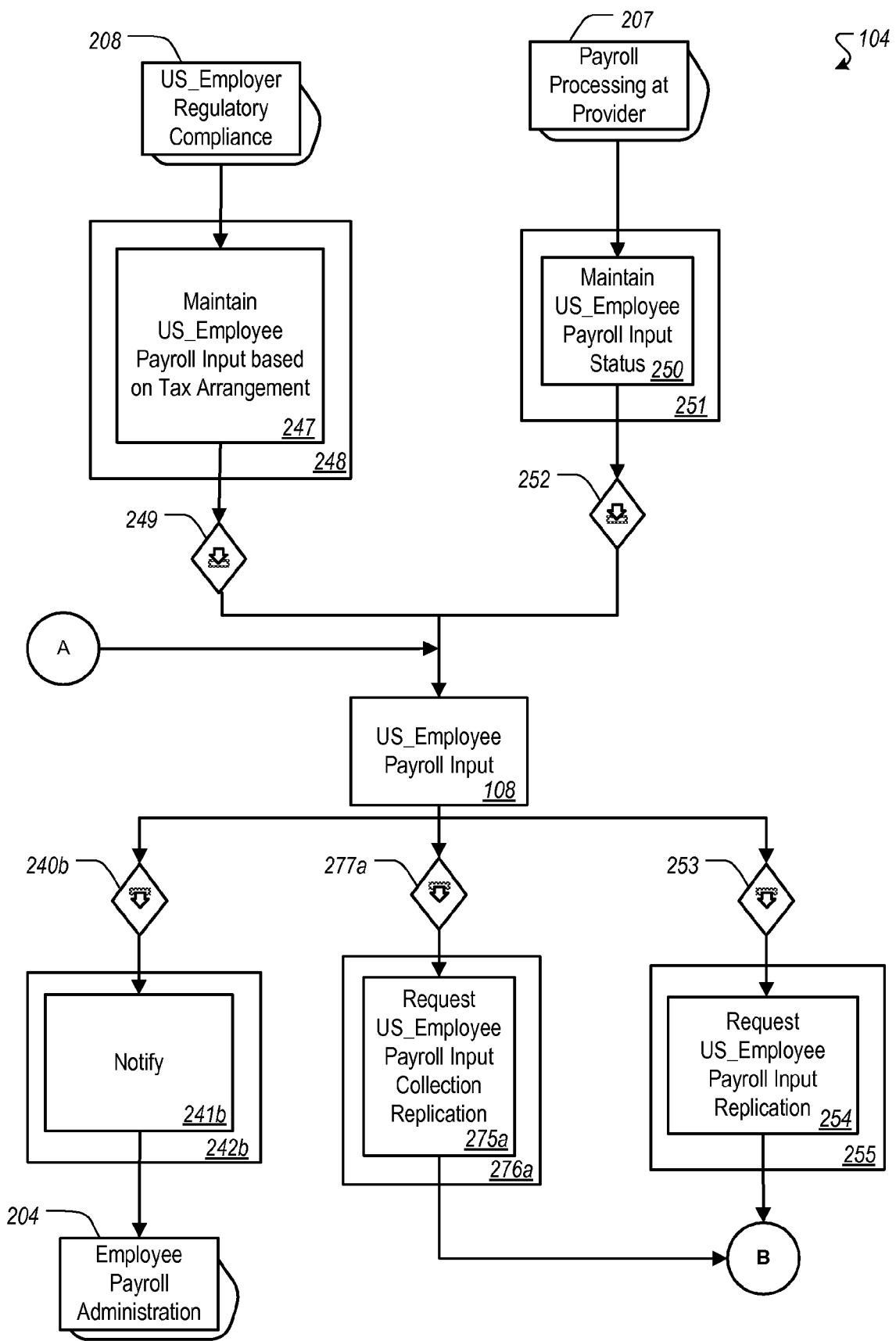
Figure 2D:
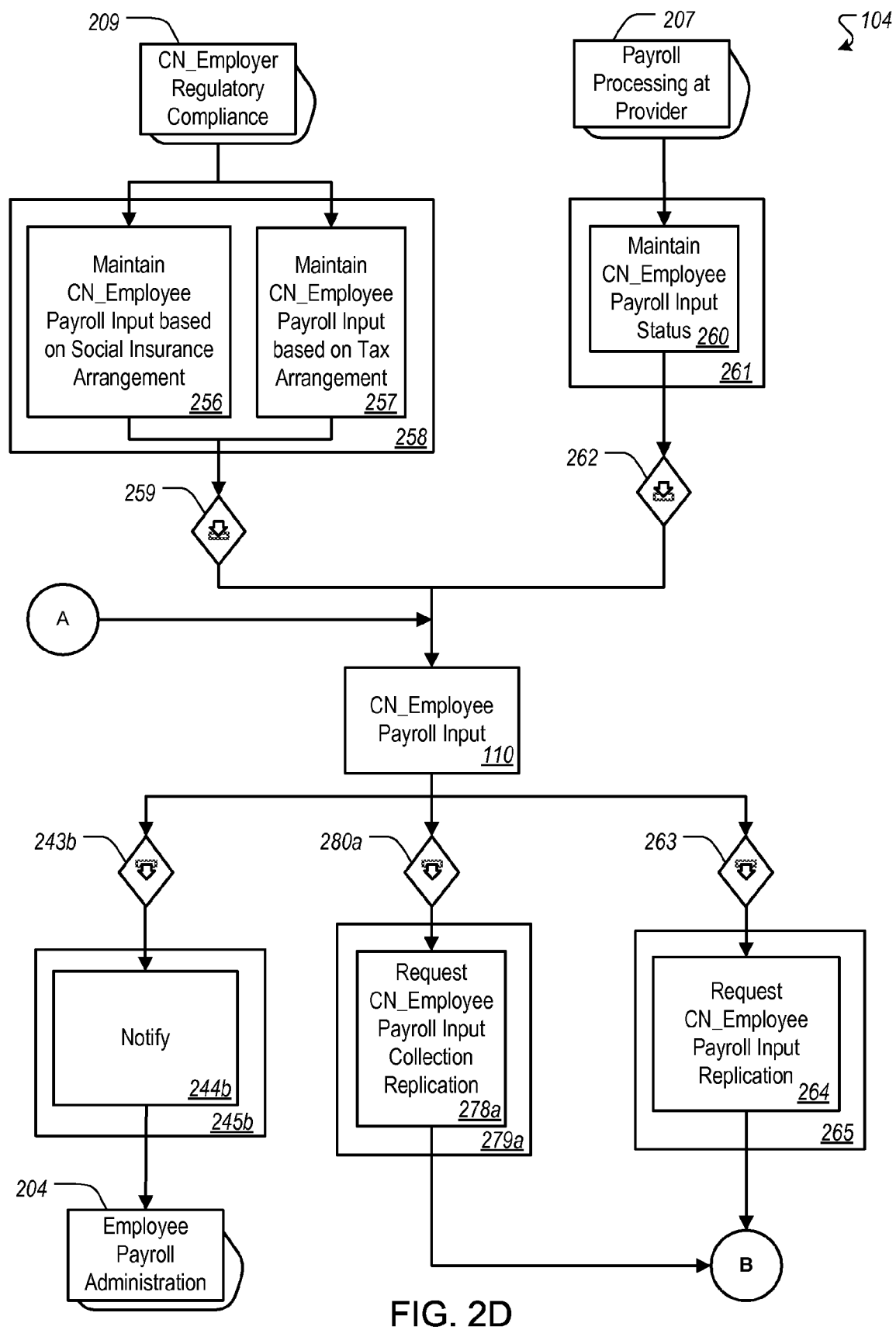
Figure 2E:
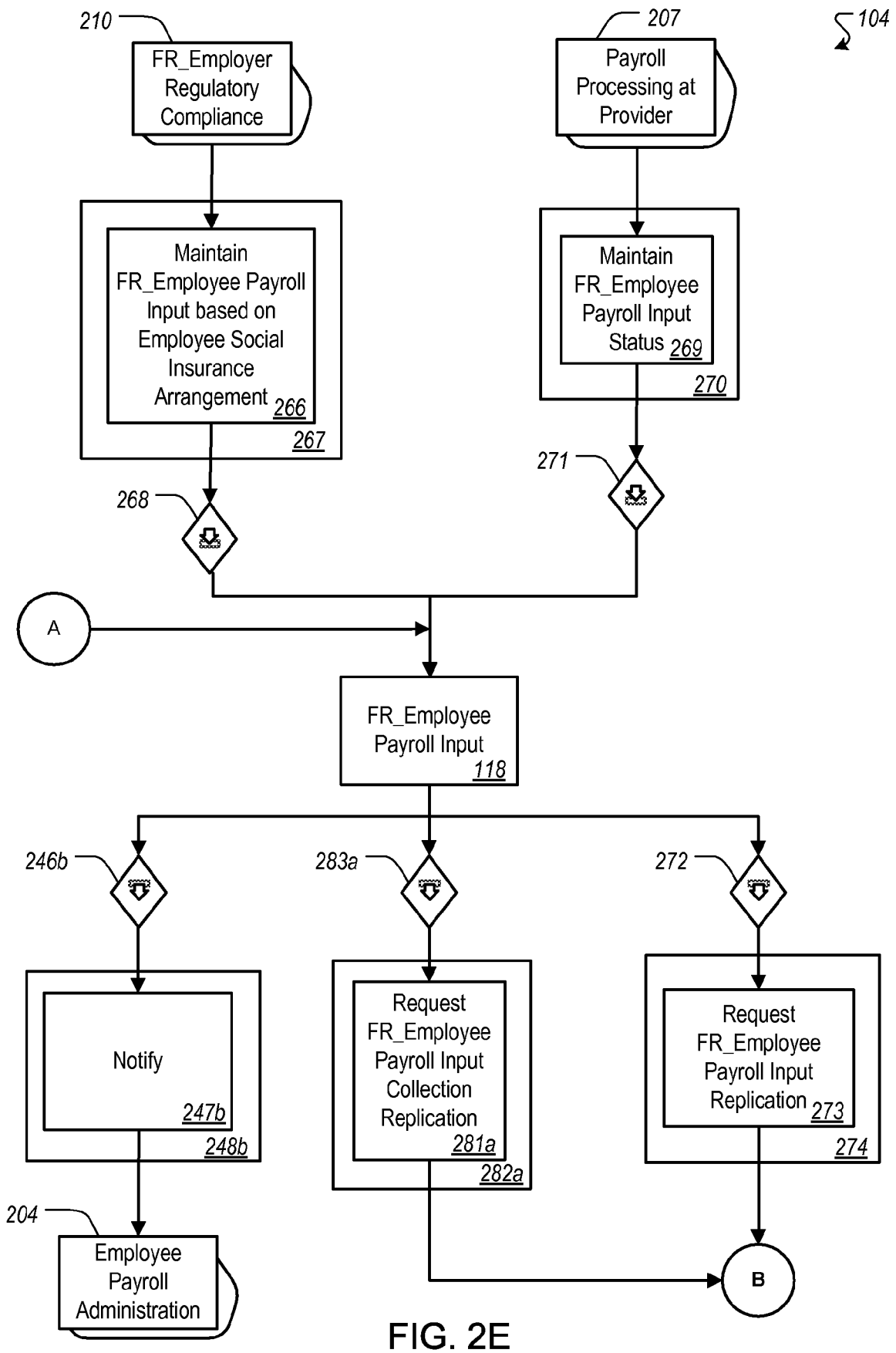
Figure 2F:
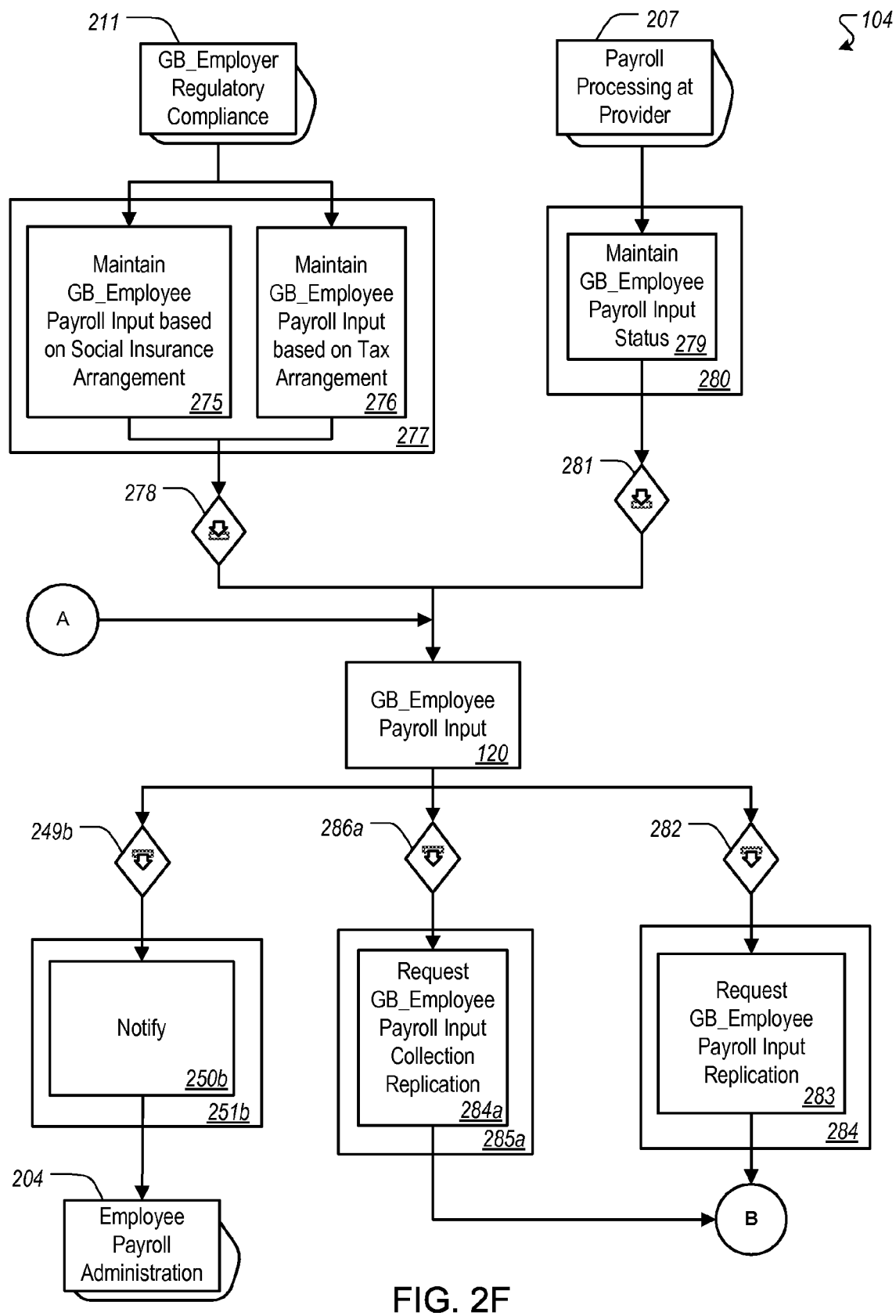
Figure 2G:
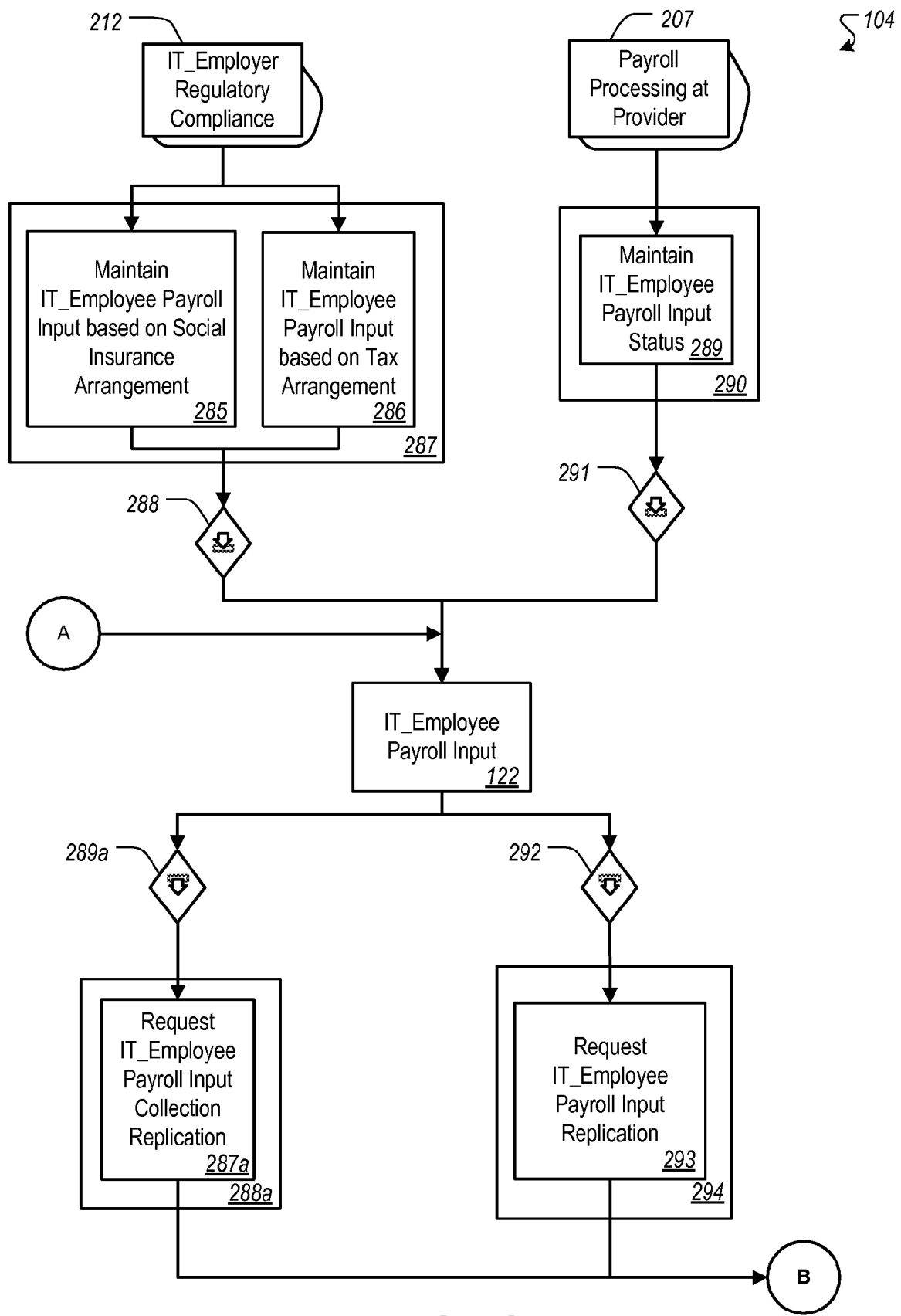
Figure 2H:
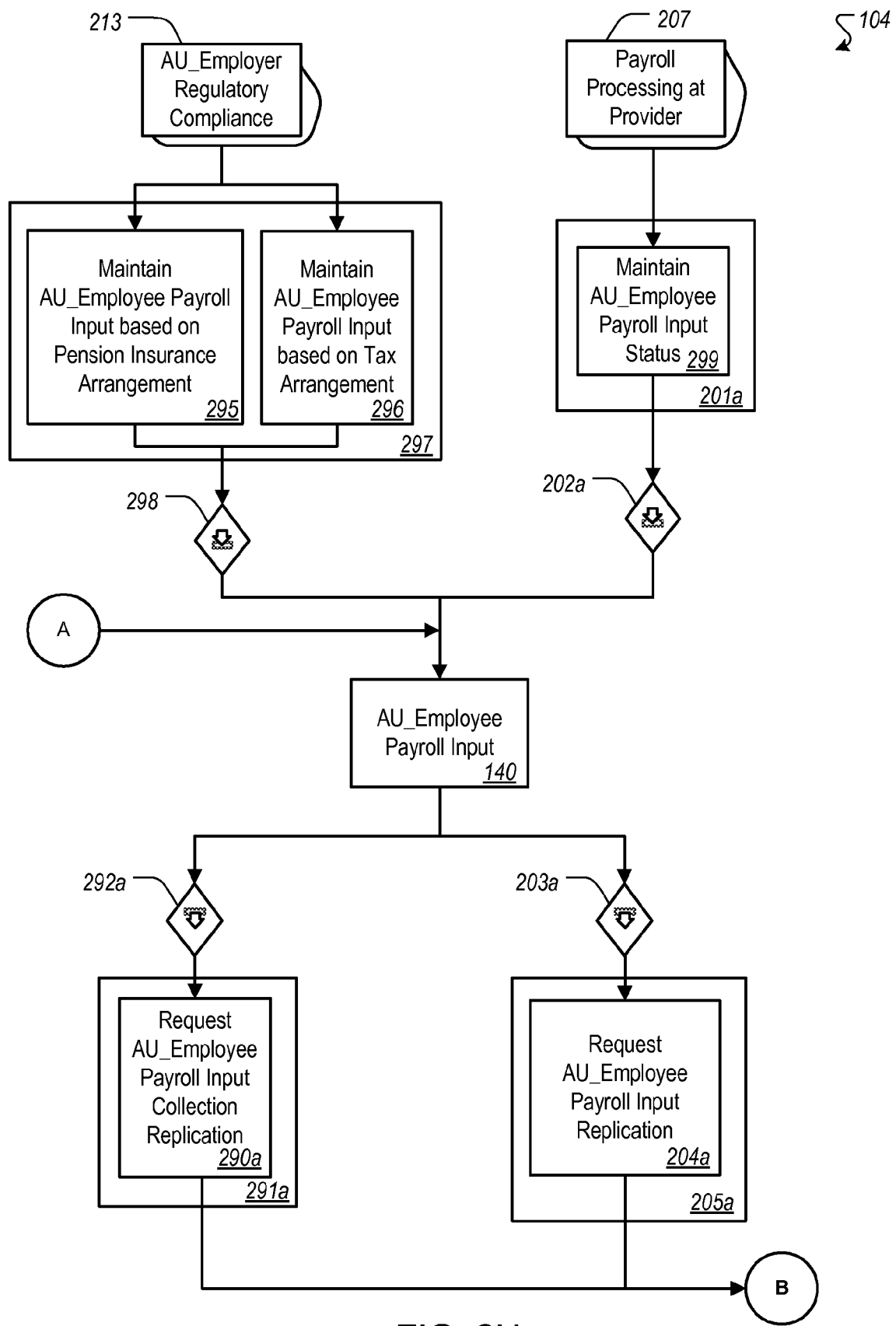
Figure 2I:
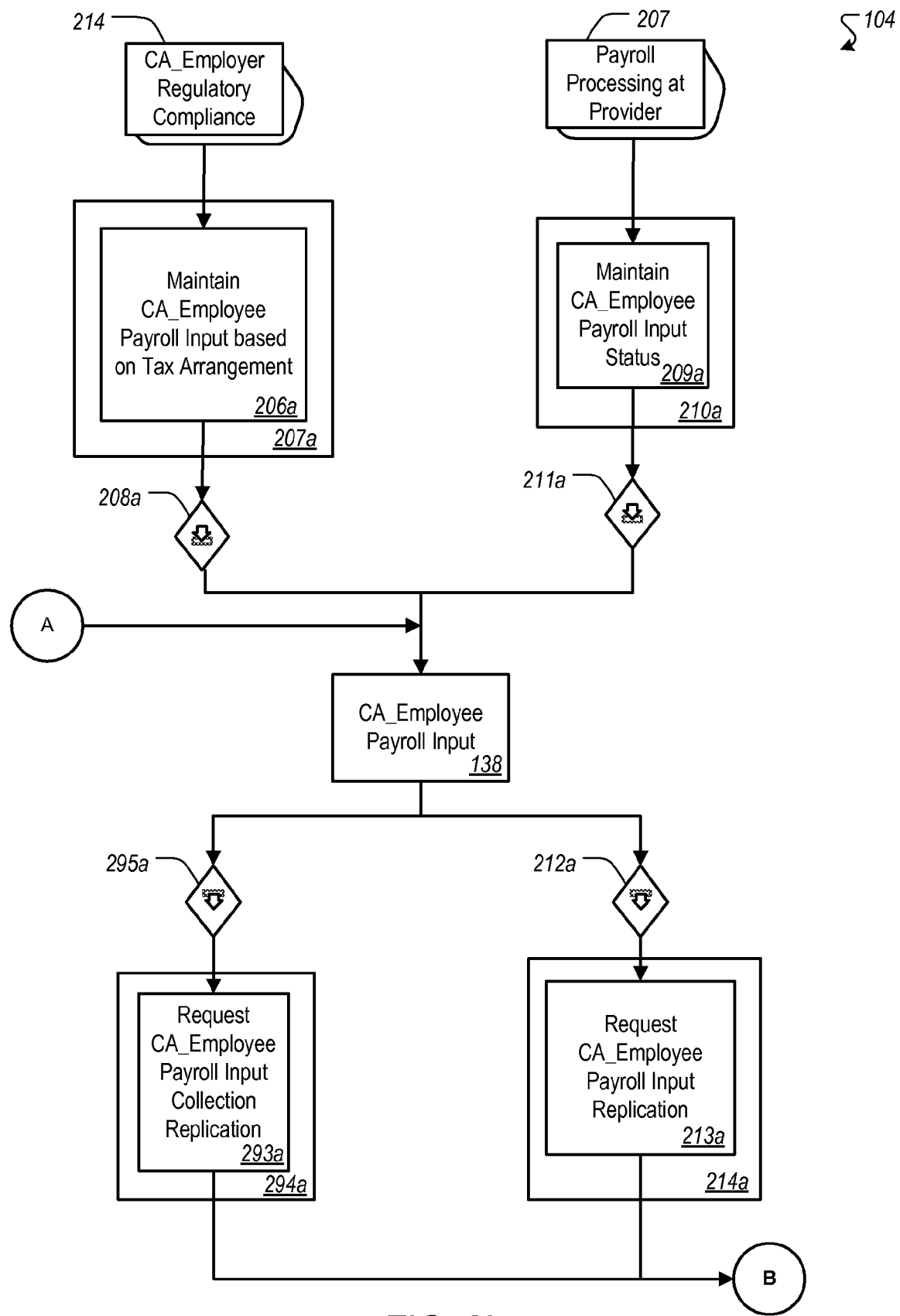
Figure 2J:
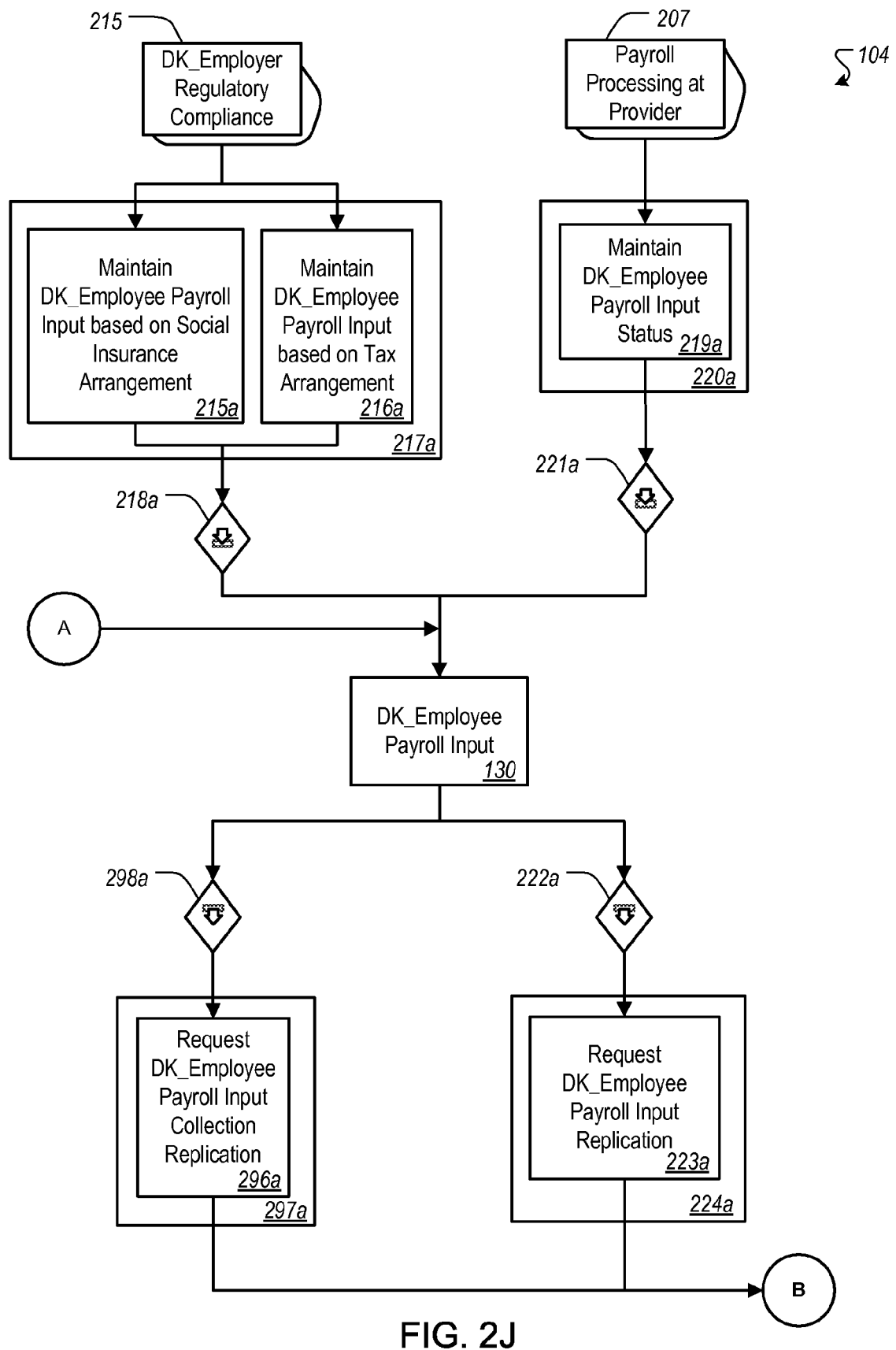
Figure 2K:
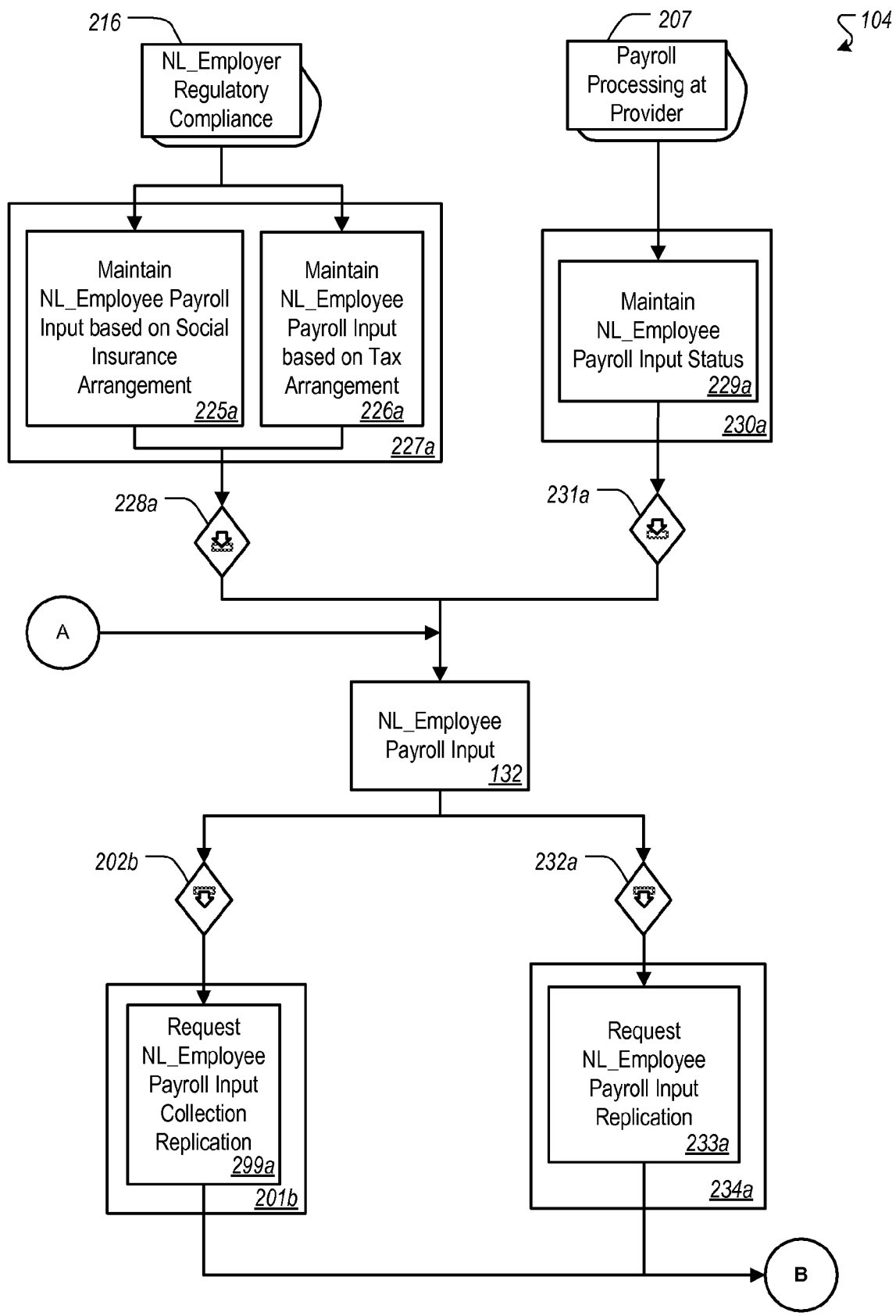
Figure 2L:
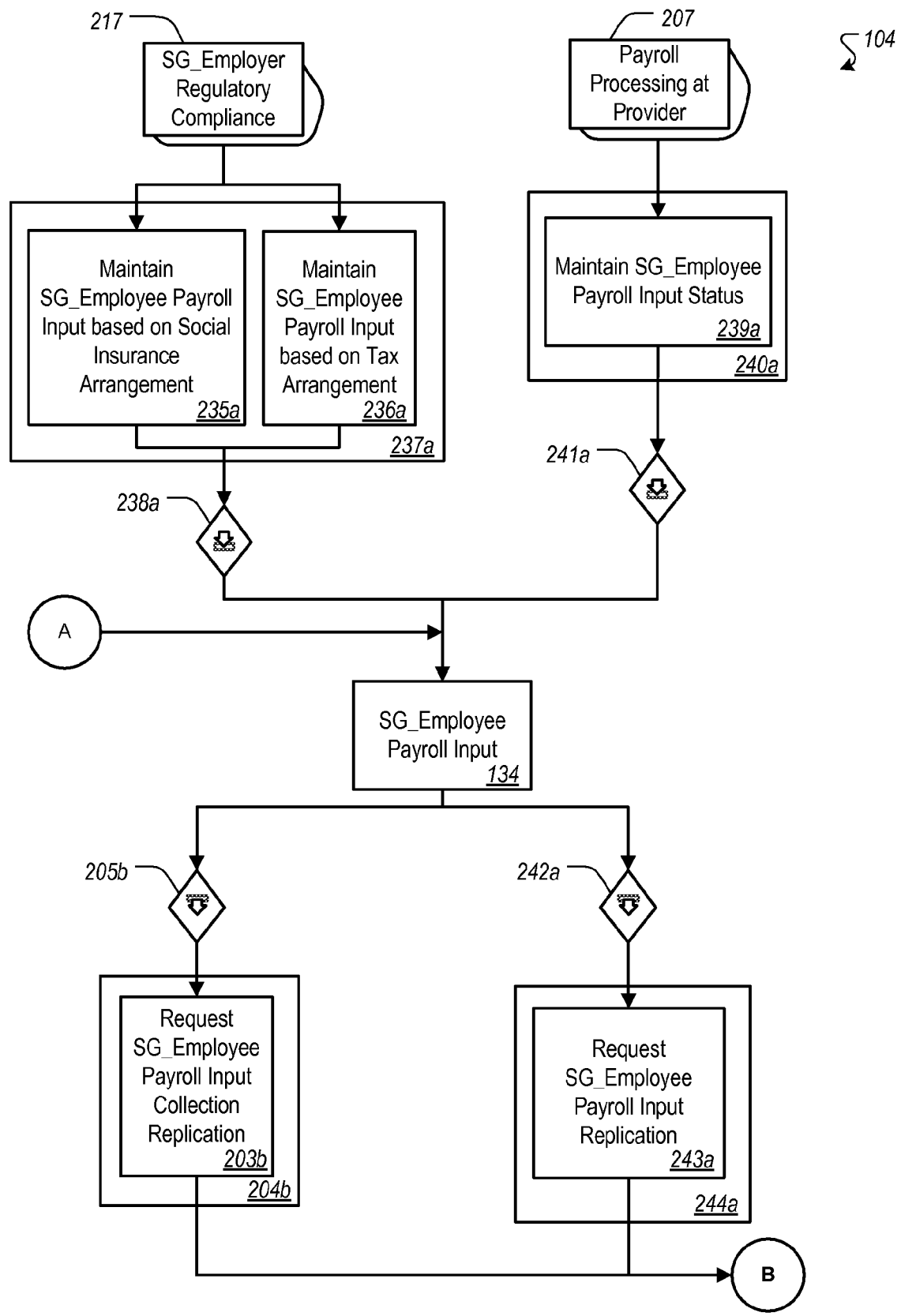
Figure 2M:
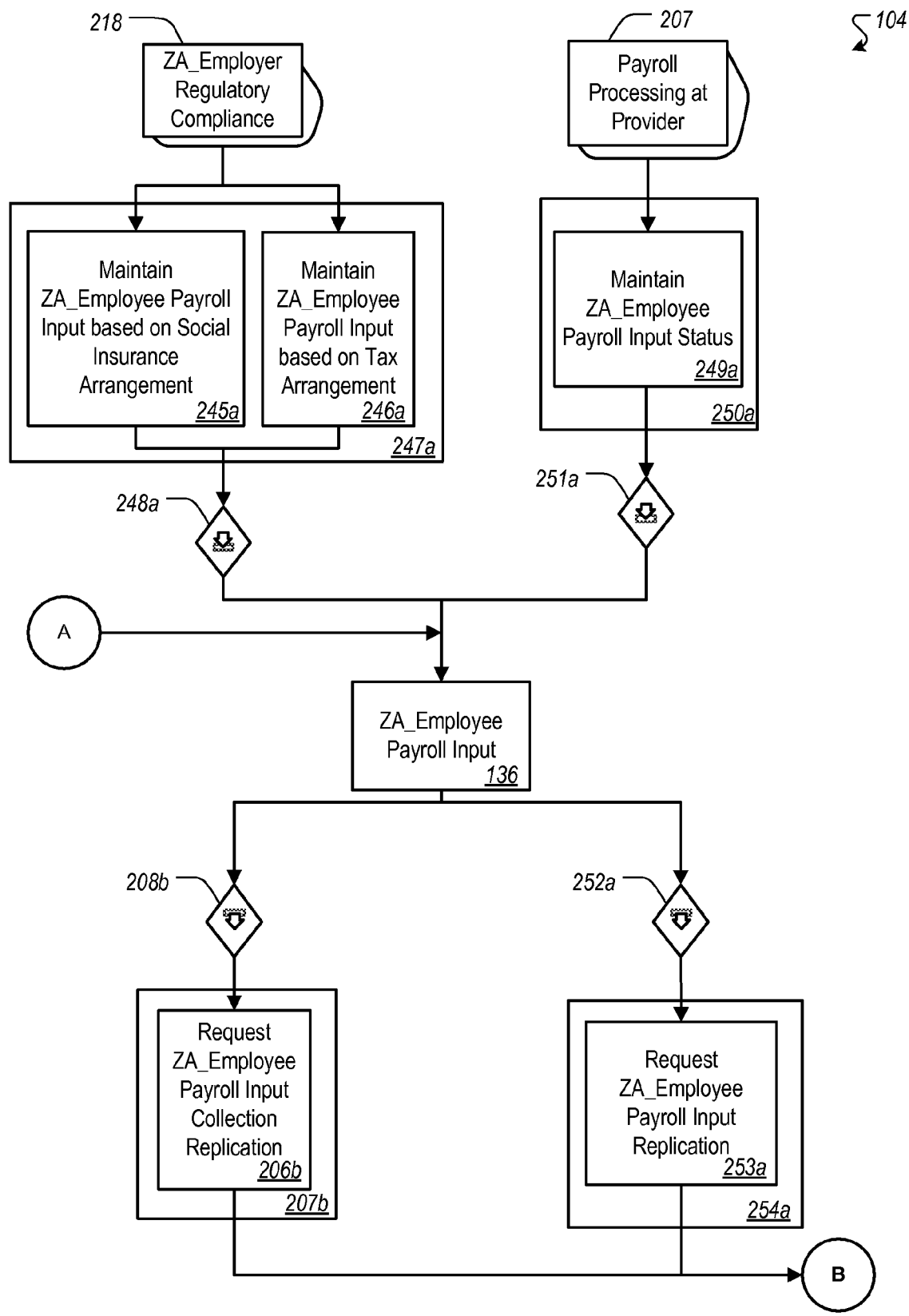
Figure 2N:
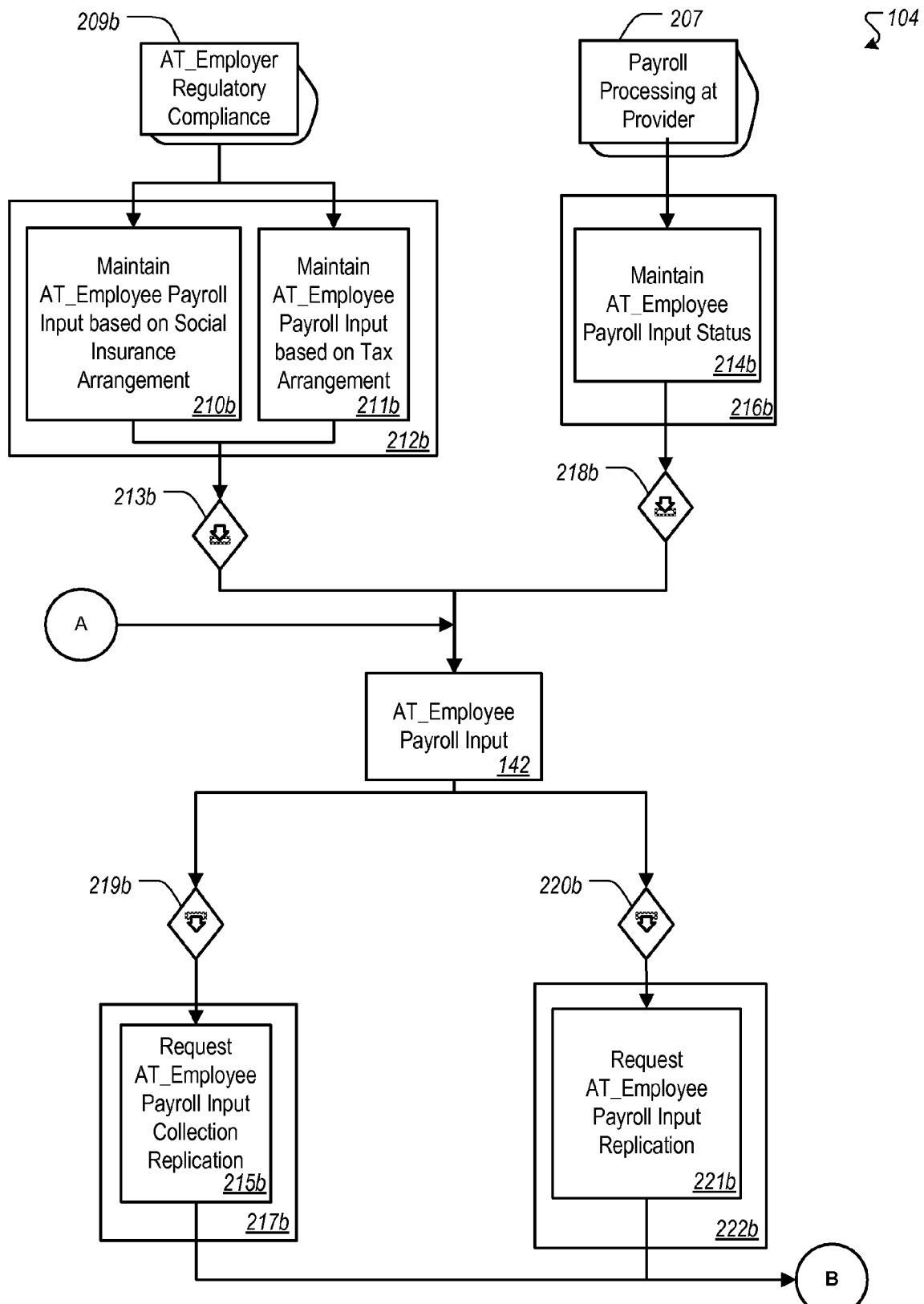
Figure 2O:
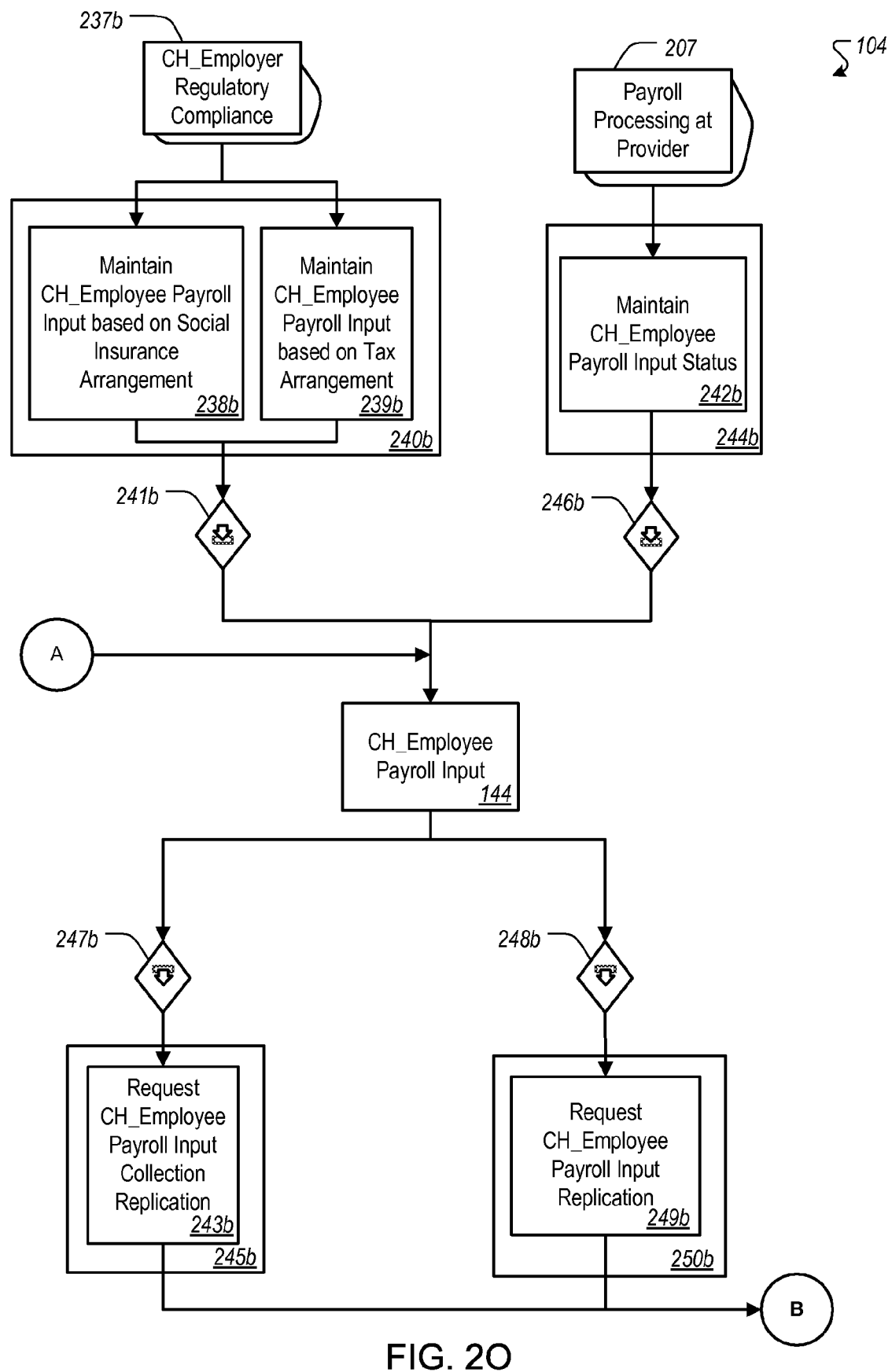
Figure 2P:
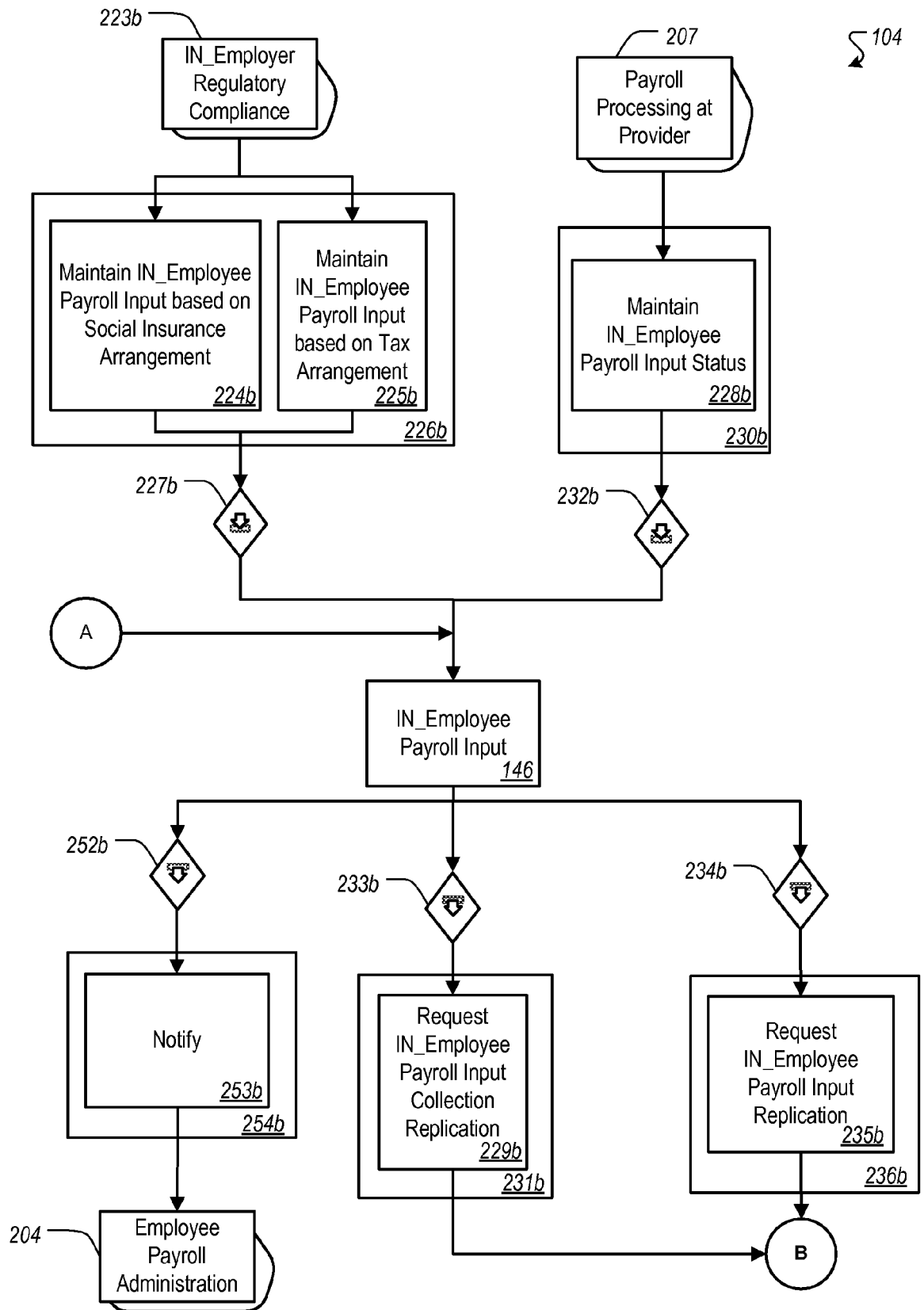
Figure 2Q:
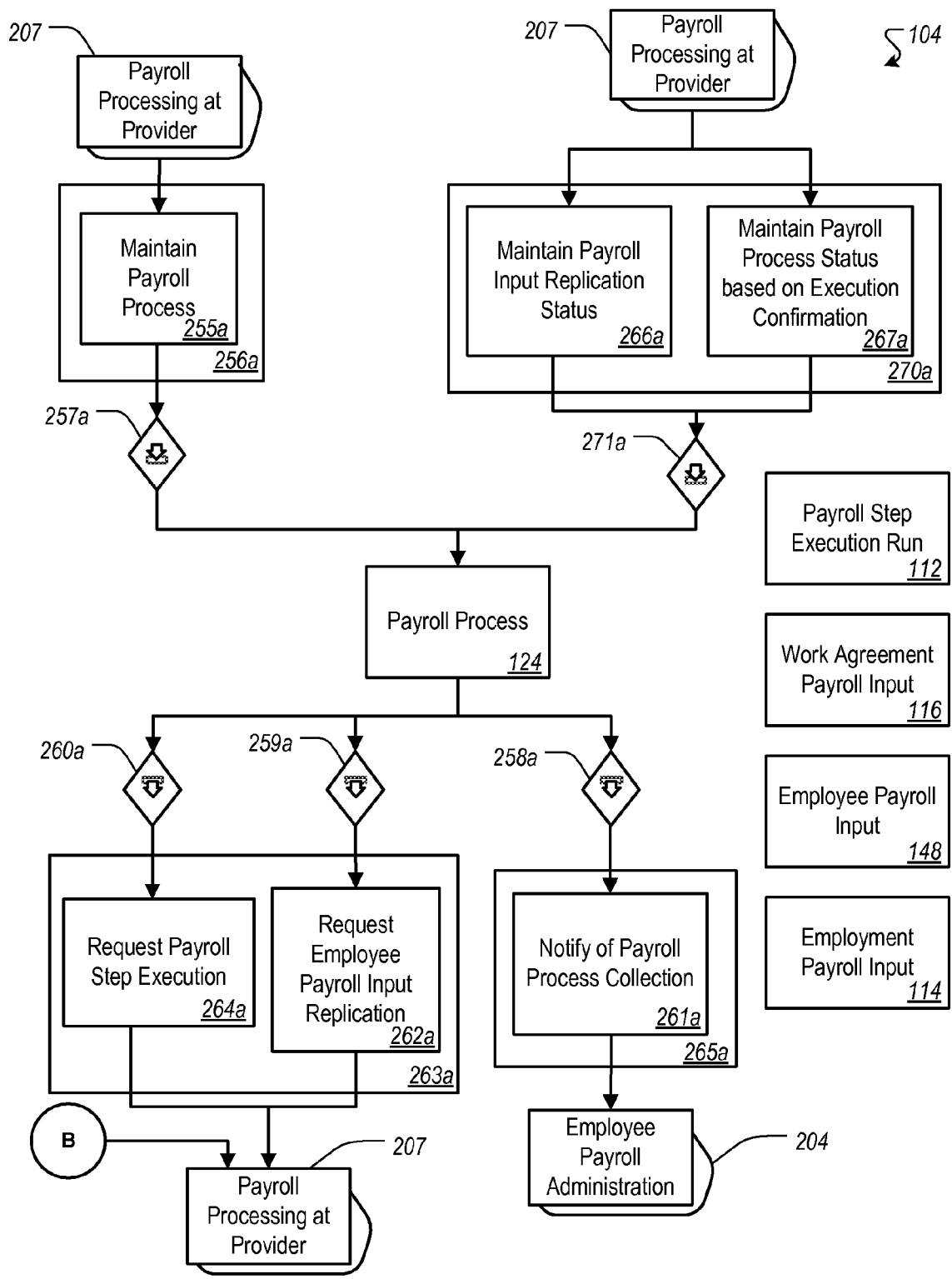

A Request Collection Replication from DE_Employee Payroll Input to Payroll Processing at Provider asynchronous outbound process agent 274*a* can invoke a Request DE_Employee Payroll Input Collection Replication operation 272*a*. For example, the outbound process agent 274*a* can request replication of a collection of DE_Employee Payroll Input business object 106 instances to a payroll provider by sending input to the Payroll Processing at Provider process component 207 (FIG. 2Q). The Request DE_Employee Payroll Input Collection Replication operation 272*a* is included in a DE_Employee Payroll Input Collection Replication Out interface 273*a*.

A Request Replication from DE_Employee Payroll Input to Payroll Processing at Provider asynchronous outbound process agent 244 can invoke a Request DE_Employee Payroll Input Replication operation 245. For example, the outbound process agent 244 can request replication of the DE_Employee Payroll Input business object 106 to a payroll provider by sending input to the Payroll Processing at Provider process component 207 (FIG. 2Q). The Request DE_Employee Payroll Input Replication operation 245 is included in a DE_Employee Payroll Input Replication Out interface 246.

A Maintain US_Employee Payroll Input based on Tax Arrangement operation 247 (FIG. 2C) can send a notification to maintain information on an employee's United States tax arrangement using a Maintain US_Employee Payroll Input based on Employer Regulatory Compliance asynchronous inbound process agent 249 to update the US_Employee Payroll Input business object 108. For example, the operation 247 can send a notification to update the US_Employee Payroll Input business object 108 if input is received from the US_Employer Regulatory Compliance process component 208. The Maintain US_Employee Payroll Input based on Tax Arrangement operation 247 is included in a US_Employer Regulatory Compliance in Payroll Input Maintenance In interface 248.

A Maintain US_Employee Payroll Input Status operation 250 can send a notification to maintain information on the status of the US_Employee Payroll Input business object 108 using a Maintain US_Employee Payroll Input Status based on Replication Confirmation asynchronous inbound process agent 252 to update the US_Employee Payroll Input business object 108. For example, the operation 250 can send a notification to update the US_Employee Payroll Input business object 108 if input is received from the Payroll Processing at Provider process component 207 (FIG. 2Q). The Maintain US_Employee Payroll Input Status operation 250 is included in a US_Employee Payroll Input Replication In interface 251.

The US_Employee Payroll Input business object 108 can receive updated information and send the update into other components to perform further operations. As shown in FIG. 2C, outbound process agents can receive information from the US_Employee Payroll Input business object 108. The US_Employee Payroll Input business object 108 can be a summary of all employee-specific input for United States payroll for one employee.

A Notify of US_Employee Payroll Input Provider Details to Employee Payroll Administration asynchronous outbound process agent 240b can invoke a Notify operation 241b. For example, the outbound process agent 240b can notify the Employee Payroll Administration process component 204 of additions or changes to information about the US_Employee Payroll Input business object 108 to a payroll provider by sending a notification to the Payroll Processing at Provider process component 207 (FIG. 2Q). The Notify operation 241b is included in a US_Employee Payroll Input Provider Details Notification Out interface 242b.

A Request Collection Replication from US_Employee Payroll Input to Payroll Processing at Provider asynchronous outbound process agent 277a can invoke a Request US_Employee Payroll Input Collection Replication operation 275a. For example, the outbound process agent 277a can request replication of a collection of US_Employee Payroll Input business object 108 instances to a payroll provider by sending input to the Payroll Processing at Provider process component 207 (FIG. 2Q). The Request US_Employee Payroll Input Collection Replication operation 275a is included in a US_Employee Payroll Input Collection Replication Out interface 276a.

A Request Replication from US_Employee Payroll Input to Payroll Processing at Provider asynchronous outbound process agent 253 can invoke a Request US_Employee Payroll Input Replication operation 254. For example, the outbound process agent 253 can request replication of the US_Employee Payroll Input business object 108 to a payroll provider by sending input to the Payroll Processing at Provider process component 207 (FIG. 2Q). The Request US_Employee Payroll Input Replication operation 254 is included in a US_Employee Payroll Input Replication Out interface 255.

A Maintain CN_Employee Payroll Input based on Social Insurance Arrangement operation 256 (FIG. 2D) can send a notification to maintain information on an employee's Chinese social insurance arrangement using a Maintain CN_Employee Payroll Input based on Employer Regulatory Compliance asynchronous inbound process agent 259 to update the CN_Employee Payroll Input business object 110. For example, the operation 256 can send a notification to update the CN_Employee Payroll Input business object 110 if input is received from the CN_Employer Regulatory Compliance process component 209.

A Maintain CN_Employee Payroll Input based on Tax Arrangement operation 257 can send a notification to maintain information on an employee's Chinese tax arrangement using the Maintain CN_Employee Payroll Input based on Employer Regulatory Compliance asynchronous inbound process agent 259 to update the CN_Employee Payroll Input business object 110. For example, the operation 257 can send a notification to update the CN_Employee Payroll Input business object 110 if input is received from the CN_Employer Regulatory Compliance process component 209. The Maintain CN_Employee Payroll Input based on Social Insurance Arrangement operation 256 and the Maintain CN_Employee Payroll Input based on Tax Arrangement operation 257 are included in a CN_Employer Regulatory Compliance in Payroll Input Maintenance In interface 258.

A Maintain CN_Employee Payroll Input Status operation 260 can send a notification to maintain information on the status of the CN_Employee Payroll Input business object 110 using a Maintain CN_Employee Payroll Input Status based on Replication Confirmation asynchronous inbound process agent 262 to update the CN_Employee Payroll Input business object 110. For example, the operation 260 can send a notification to update the CN_Employee Payroll Input business object 110 if input is received from the Payroll Processing at Provider process component 207 (FIG. 2Q). The Maintain CN_Employee Payroll Input Status operation 260 is included in a CN_Employee Payroll Input Replication In interface 261.

The CN_Employee Payroll Input business object 110 can receive updated information and send the update into other components to perform further operations. As shown in FIG. 2D, outbound process agents can receive information from the CN_Employee Payroll Input business object 110. The CN_Employee Payroll Input business object 110 can be a summary of all employee-specific input for Chinese payroll for one employee.

A Notify of CN_Employee Payroll Input Provider Details to Employee Payroll Administration asynchronous outbound process agent 243b can invoke a Notify operation 244b. For example, the outbound process agent 243b can notify the Employee Payroll Administration process component 204 of additions or changes to information about the CN_Employee Payroll Input business object 110 to a payroll provider by sending a notification to the Payroll Processing at Provider process component 207 (FIG. 2Q). The Notify operation 244b is included in a CN_Employee Payroll Input Provider Details Notification Out interface 245b.

A Request Collection Replication from CN_Employee Payroll Input to Payroll Processing at Provider asynchronous outbound process agent 280a can invoke a Request CN_Employee Payroll Input Collection Replication operation 278a. For example, the outbound process agent 280a can request replication of a collection of CN_Employee Payroll Input business object 110 instances to a payroll provider by sending input to the Payroll Processing at Provider process component 207 (FIG. 2Q). The Request CN_Employee Payroll Input Collection Replication operation 278a is included in a CN_Employee Payroll Input Collection Replication Out interface 279a.

A Request Replication from CN_Employee Payroll Input to Payroll Processing at Provider asynchronous outbound process agent 263 can invoke a Request CN_Employee Payroll Input Replication operation 264. For example, the outbound process agent 263 can request replication of the CN_Employee Payroll Input business object 110 to a payroll provider by sending input to the Payroll Processing at Provider process component 207 (FIG. 2Q). The Request CN_Employee Payroll Input Replication operation 264 is included in a CN_Employee Payroll Input Replication Out interface 265.

A Maintain FR_Employee Payroll Input based on Social Insurance Arrangement operation 266 (FIG. 2E) can send a notification to maintain information on an employee's French social insurance arrangement using a Maintain FR_Employee Payroll Input based on Employer Regulatory Compliance asynchronous inbound process agent 268 to update the FR_Employee Payroll Input business object 118. For example, the operation 266 can send a notification to update the FR_Employee Payroll Input business object 118 if input is received from the FR_Employer Regulatory Compliance process component 210. The Maintain FR_Employee Payroll Input based on Social Insurance Arrangement operation 266 is included in an FR_Employer Regulatory Compliance in Payroll Input Maintenance In interface 267.

A Maintain FR_Employee Payroll Input Status operation 269 can send a notification to maintain information on the status of the FR_Employee Payroll Input business object 118 using a Maintain FR_Employee Payroll Input Status based on Replication Confirmation asynchronous inbound process agent 271 to update the FR_Employee Payroll Input business object 118. For example, the operation 269 can send a notification to update the FR_Employee Payroll Input business object 118 if input is received from the Payroll Processing at Provider process component 207 (FIG. 2Q). The Maintain FR_Employee Payroll Input Status operation 269 is included in an FR_Employee Payroll Input Replication In interface 270.

The FR_Employee Payroll Input business object 118 can receive updated information and send the update into other components to perform further operations. As shown in FIG. 2E, outbound process agents can receive information from the FR_Employee Payroll Input business object 118. The FR_Employee Payroll Input business object 118 can be a summary of all employee-specific input for French payroll for one employee.

A Notify of FR_Employee Payroll Input Provider Details to Employee Payroll Administration asynchronous outbound process agent 246b can invoke a Notify operation 247b. For example, the outbound process agent 246b can notify the Employee Payroll Administration process component 204 of additions or changes to information about the FR_Employee Payroll Input business object 118 to a payroll provider by sending a notification to the Payroll Processing at Provider process component 207 (FIG. 2Q). The Notify operation 247b is included in an FR_Employee Payroll Input Provider Details Notification Out interface 248b.

A Request Collection Replication from FR_Employee Payroll Input to Payroll Processing at Provider asynchronous outbound process agent 283a can invoke a Request FR_Employee Payroll Input Collection Replication operation 281a. For example, the outbound process agent 283a can request replication of a collection of FR_Employee Payroll Input business object 118 instances to a payroll provider by sending input to the Payroll Processing at Provider process component 207 (FIG. 2Q). The Request FR_Employee Payroll Input Collection Replication operation 281 a is included in an FR_Employee Payroll Input Collection Replication Out interface 282a.

A Request Replication from FR_Employee Payroll Input to Payroll Processing at Provider at Provider asynchronous outbound process agent 272 can invoke a Request FR_Employee Payroll Input Replication operation 273. For example, the outbound process agent 272 can request replication of the FR_Employee Payroll Input business object 118 to a payroll provider by sending input to the Payroll Processing at Provider process component 207 (FIG. 2Q). The Request FR_Employee Payroll Input Replication operation 273 is included in an FR_Employee Payroll Input Replication Out interface 274.

A Maintain GB_Employee Payroll Input based on Social Insurance Arrangement operation 275 (FIG. 2F) can send a notification to maintain information on an employee's British social insurance arrangement using a Maintain GB_Employee Payroll Input based on Employer Regulatory Compliance asynchronous inbound process agent 278 to update the GB_Employee Payroll Input business object 120. For example, the operation 275 can send a notification to update the GB_Employee Payroll Input business object 120 if input is received from the GB_Employer Regulatory Compliance process component 211.

A Maintain GB_Employee Payroll Input based on Tax Arrangement operation 276 can send a notification to maintain information on an employee's British tax arrangement using the Maintain GB_Employee Payroll Input based on Employer Regulatory Compliance asynchronous inbound process agent 278 to update the GB_Employee Payroll Input business object 120. For example, the operation 276 can send a notification to update the GB_Employee Payroll Input business object 120 if input is received from the GB_Employer Regulatory Compliance process component 211. The Maintain GB_Employee Payroll Input based on Social Insurance Arrangement operation 275 and the Maintain GB_Employee Payroll Input based on Tax Arrangement operation 276 are included in a GB_Employer Regulatory Compliance in Payroll Input Maintenance In interface 277.

A Maintain GB_Employee Payroll Input Status operation 279 can send a notification to maintain information on the status of the GB_Employee Payroll Input business object 120 using a Maintain GB_Employee Payroll Input based on Replication Confirmation asynchronous inbound process agent 281 to update the GB_Employee Payroll Input business object 120. For example, the operation 279 can send a notification to update the GB_Employee Payroll Input business object 120 if input is received from the Payroll Processing at Provider process component 207 (FIG. 2Q). The Maintain GB_Employee Payroll Input Status operation 279 is included in a GB_Employee Payroll Input Replication In interface 280.

The GB_Employee Payroll Input business object 120 can receive updated information and send the update into other components to perform further operations. As shown in FIG. 2F, outbound process agents can receive information from the GB_Employee Payroll Input business object 120. The GB_Employee Payroll Input business object 120 can be a summary of all employee-specific input for British payroll for one employee.

A Notify of GB_Employee Payroll Input Provider Details to Employee Payroll Administration asynchronous outbound process agent 249b can invoke a Notify operation 250b. For example, the outbound process agent 249b can notify the Employee Payroll Administration process component 204 of additions or changes to information about the GB_Employee Payroll Input business object 120 to a payroll provider by sending a notification to the Payroll Processing at Provider process component 207 (FIG. 2Q). The Notify operation 250b is included in a GB_Employee Payroll Input Provider Details Notification Out interface 251b.

A Request Collection Replication from GB_Employee Payroll Input to Payroll Processing at Provider asynchronous outbound process agent 286a can invoke a Request GB_Employee Payroll Input Collection Replication operation 284a. For example, the outbound process agent 286a can request replication of a collection of GB_Employee Payroll Input business object 120 instances to a payroll provider by sending input to the Payroll Processing at Provider process component 207 (FIG. 2Q). The Request GB_Employee Payroll Input Collection Replication operation 284*a* is included in a GB_Employee Payroll Input Collection Replication Out interface 285*a*.

A Request Replication from GB_Employee Payroll Input to Payroll Processing at Provider asynchronous outbound process agent 282 can invoke a Request GB_Employee Payroll Input Replication operation 283. For example, the outbound process agent 282 can request replication of the GB_Employee Payroll Input business object 120 to a payroll provider by sending input to the Payroll Processing at Provider process component 207 (FIG. 2Q). The Request GB_Employee Payroll Input Replication operation 283 is included in a GB_Employee Payroll Input Replication Out interface 284.

A Maintain IT_Employee Payroll Input based on Social Insurance Arrangement operation 285 (FIG. 2G) can send a notification to maintain information on an employee's Italian social insurance arrangement using a Maintain IT_Employee Payroll Input based on Employer Regulatory Compliance asynchronous inbound process agent 288 to update the IT_Employee Payroll Input business object 122. For example, the operation 285 can send a notification to update the IT_Employee Payroll Input business object 122 if input is received from the IT_Employer Regulatory Compliance process component 212.

A Maintain IT_Employee Payroll Input based on Tax Arrangement operation 286 can send a notification to maintain information on an employee's Italian tax arrangement using the Maintain IT_Employee Payroll Input based on Employer Regulatory Compliance asynchronous inbound process agent 288 to update the IT_Employee Payroll Input business object 122. For example, the operation 286 can send a notification to update the IT_Employee Payroll Input business object 122 if input is received from the IT_Employer Regulatory Compliance process component 212. The Maintain IT_Employee Payroll Input based on Social Insurance Arrangement operation 285 and the Maintain IT_Employee Payroll Input based on Tax Arrangement operation 286 are included in an IT_Employer Regulatory Compliance in Payroll Input Maintenance In interface 287.

A Maintain IT_Employee Payroll Input Status operation 289 can send a notification to maintain information on the status of the IT_Employee Payroll Input business object 122 using a Maintain IT_Employee Payroll Input Status based on Replication Confirmation asynchronous inbound process agent 291 to update the IT_Employee Payroll Input business object 122. For example, the operation 289 can send a notification to update the IT_Employee Payroll Input business object 122 if input is received from the Payroll Processing at Provider process component 207 (FIG. 2Q). The Maintain IT_Employee Payroll Input Status operation 289 is included in an IT_Employee Payroll Input Replication In interface 290.

The IT_Employee Payroll Input business object 122 can receive updated information and send the update into other components to perform further operations. As shown in FIG. 2G, outbound process agents can receive information from the IT_Employee Payroll Input business object 122. The IT_Employee Payroll Input business object 122 can be a summary of all employee-specific input for Italian payroll for one employee.

A Request Collection Replication from IT_Employee Payroll Input to Payroll Processing at Provider asynchronous outbound process agent 289*a* can invoke a Request IT_Employee Payroll Input Collection Replication operation 287*a*. For example, the outbound process agent 289*a* can request replication of a collection of IT_Employee Payroll Input business object 122 instances to a payroll provider by sending input to the Payroll Processing at Provider process component 207 (FIG. 2Q). The Request IT_Employee Payroll Input Collection Replication operation 287*a* is included in an IT_Employee Payroll Input Collection Replication Out interface 288*a*.

A Request Replication from IT_Employee Payroll Input to Payroll Processing at Provider asynchronous outbound process agent 292 can invoke a Request IT_Employee Payroll Input Replication operation 293. For example, the outbound process agent 292 can request replication of the IT_Employee Payroll Input business object 122 to a payroll provider by sending input to the Payroll Processing at Provider process component 207 (FIG. 2Q). The Request IT_Employee Payroll Input Replication operation 293 is included in an IT_Employee Payroll Input Replication Out interface 294.

A Maintain AU_Employee Payroll Input based on Pension Insurance Arrangement operation 295 (FIG. 2H) can send a notification to maintain information on an employee's Australian pension insurance arrangement using a Maintain AU_Employee Payroll Input based on Employer Regulatory Compliance asynchronous inbound process agent 298 to update the AU_Employee Payroll Input business object 140. For example, the operation 295 can send a notification to update the AU_Employee Payroll Input business object 140 if input is received from the AU_Employer Regulatory Compliance process component 213.

A Maintain AU_Employee Payroll Input based on Tax Arrangement operation 296 can send a notification to maintain information on an employee's Australian tax arrangement using the Maintain AU_Employee Payroll Input based on Employer Regulatory Compliance asynchronous inbound process agent 298 to update the AU_Employee Payroll Input business object 140. For example, the operation 296 can send a notification to update the AU_Employee Payroll Input business object 140 if input is received from the AU_Employer Regulatory Compliance process component 213. The Maintain AU_Employee Payroll Input based on Pension Insurance Arrangement operation 295 and the Maintain AU_Employee Payroll Input based on Tax Arrangement operation 296 are included in an AU_Employer Regulatory Compliance in Payroll Input Maintenance In interface 297.

A Maintain AU_Employee Payroll Input Status operation 299 can send a notification to maintain information on the status of the AU_Employee Payroll Input business object 140 using a Maintain AU_Employee Payroll Input based on Replication Confirmation asynchronous inbound process agent 202*a* to update the AU_Employee Payroll Input business object 140. For example, the operation 299 can send a notification to update the AU_Employee Payroll Input business object 140 if input is received from the Payroll Processing at Provider process component 207 (FIG. 2Q). The Maintain AU Employee Payroll Input Status operation 299 is included in an AU_Employee Payroll Input Replication In interface 201*a*.

The AU_Employee Payroll Input business object 140 can receive updated information and send the update into other components to perform further operations. As shown in FIG. 2H, outbound process agents can receive information from the AU_Employee Payroll Input business object 140. The AU_Employee Payroll Input business object 140 can be a summary of all employee-specific input for Australian payroll for one employee.

A Request Collection Replication from AU_Employee Payroll Input to Payroll Processing at Provider asynchronous outbound process agent 292*a* can invoke a Request AU_Employee Payroll Input Collection Replication operation 290*a*.

For example, the outbound process agent 292a can request replication of a collection of AU_Employee Payroll Input business object 140 instances to a payroll provider by sending input to the Payroll Processing at Provider process component 207 (FIG. 2Q). The Request AU_Employee Payroll Input Collection Replication operation 290a is included in an AU_Employee Payroll Input Collection Replication Out interface 291a.

A Request Replication from AU_Employee Payroll Input to Payroll Processing at Provider asynchronous outbound process agent 203a can invoke a Request AU_Employee Payroll Input Replication operation 204a. For example, the outbound process agent 203a can request replication of the AU_Employee Payroll Input business object 140 to a payroll provider by sending input to the Payroll Processing at Provider process component 207 (FIG. 2Q). The Request AU Employee Payroll Input Replication operation 204a is included in an AU_Employee Payroll Input Replication Out interface 205a.

A Maintain CA_Employee Payroll Input based on Tax Arrangement operation 206a (FIG. 21) can send a notification to maintain information on an employee's Canadian tax arrangement using a Maintain CA_Employee Payroll Input based on Employer Regulatory Compliance asynchronous inbound process agent 208a to update the CA_Employee Payroll Input business object 138. For example, the operation 206a can send a notification to update the CA_Employee Payroll Input business object 138 if input is received from the CA_Employer Regulatory Compliance process component 214. The Maintain CA_Employee Payroll Input based on Tax Arrangement operation 206a is included in a CA_Employer Regulatory Compliance in Payroll Input Maintenance In interface 207a.

A Maintain CA_Employee Payroll Input Status operation 209a can send a notification to maintain information on the status of the CA_Employee Payroll Input business object 138 using a Maintain CA_Employee Payroll Input Status based on Replication Confirmation asynchronous inbound process agent 211a to update the CA_Employee Payroll Input business object 138. For example, the operation 209a can send a notification to update the CA_Employee Payroll Input business object 138 if input is received from the Payroll Processing at Provider process component 207 (FIG. 2Q). The Maintain CA_Employee Payroll Input Status operation 209a is included in a CA_Employee Payroll Input Replication In interface 210a.

The CA_Employee Payroll Input business object 138 can receive updated information and send the update into other components to perform further operations. As shown in FIG. 21, outbound process agents can receive information from the CA_Employee Payroll Input business object 138. The CA_Employee Payroll Input business object 138 can be a summary of all employee-specific input for Canadian payroll for one employee.

A Request Collection Replication from CA_Employee Payroll Input to Payroll Processing at Provider asynchronous outbound process agent 295a can invoke a Request CA_Employee Payroll Input Collection Replication operation 293a. For example, the outbound process agent 295a can request replication of a collection of CA_Employee Payroll Input business object 138 instances to a payroll provider by sending input to the Payroll Processing at Provider process component 207 (FIG. 2Q). The Request CA_Employee Payroll Input Collection Replication operation 293a is included in a CA_Employee Payroll Input Collection Replication Out interface 294a.

A Request Replication from CA_Employee Payroll Input to Payroll Processing at Provider asynchronous outbound process agent 212a can invoke a Request CA_Employee Payroll Input Replication operation 213a. For example, the outbound process agent 212a can request replication of the CA_Employee Payroll Input business object 138 to a payroll provider by sending input to the Payroll Processing at Provider process component 207 (FIG. 2Q). The Request CA_Employee Payroll Input Replication operation 213a is included in a CA_Employee Payroll Input Replication Out interface 214a.

A Maintain DK_Employee Payroll Input based on Social Insurance Arrangement operation 215a (FIG. 2J) can send a notification to maintain information on an employee's Danish social insurance arrangement using a Maintain DK_Employee Payroll Input Status based on Employer Regulatory Compliance asynchronous inbound process agent 218a to update the DK_Employee Payroll Input business object 130. For example, the operation 215a can send a notification to update the DK_Employee Payroll Input business object 130 if input is received from the DK_Employer Regulatory Compliance process component 215.

A Maintain DK_Employee Payroll Input based on Tax Arrangement operation 216a can send a notification to maintain information on an employee's Danish tax arrangement using the Maintain DK_Employee Payroll Input Status based on Employer Regulatory Compliance asynchronous inbound process agent 218a to update the DK_Employee Payroll Input business object 130. For example, the operation 216a can send a notification to update the DK_Employee Payroll Input business object 130 if input is received from the DK_Employer Regulatory Compliance process component 215. The Maintain DK_Employee Payroll Input based on Social Insurance Arrangement operation 215a and the Maintain DK_Employee Payroll Input based on Tax Arrangement operation 216a are included in a DK_Employer Regulatory Compliance in Payroll Input Maintenance In interface 217a.

A Maintain DK_Employee Payroll Input Status operation 219a can send a notification to maintain information on the status of the DK_Employee Payroll Input business object 130 using a Maintain DK_Employee Payroll Input Status based on Replication Confirmation asynchronous inbound process agent 221a to update the DK_Employee Payroll Input business object 130. For example, the operation 219a can send a notification to update the DK_Employee Payroll Input business object 130 if input is received from the Payroll Processing at Provider process component 207 (FIG. 2Q). The Maintain DK_Employee Payroll Input Status operation 219a is included in a DK_Employee Payroll Input Replication In interface 220a.

The DK_Employee Payroll Input business object 130 can receive updated information and send the update into other components to perform further operations. As shown in FIG. 2J, outbound process agents can receive information from the DK_Employee Payroll Input business object 130. The DK_Employee Payroll Input business object 130 can be a summary of all employee-specific input for Danish payroll for one employee.

A Request Collection Replication from DK_Employee Payroll Input to Payroll Processing at Provider asynchronous outbound process agent 298a can invoke a Request DK_Employee Payroll Input Collection Replication operation 296a. For example, the outbound process agent 298a can request replication of a collection of DK_Employee Payroll Input business object 130 instances to a payroll provider by sending input to the Payroll Processing at Provider process component 207 (FIG. 2Q). The Request DK_Employee Payroll Input Collection Replication operation 296a is included in a DK_Employee Payroll Input Collection Replication Out interface 297a.

A Request Replication from DK_Employee Payroll Input to Payroll Processing at Provider asynchronous outbound process agent 222a can invoke a Request DK_Employee Payroll Input Replication operation 223a. For example, the outbound process agent 222a can request replication of the DK_Employee Payroll Input business object 130 to a payroll provider by sending input to the Payroll Processing at Provider process component 207 (FIG. 2Q). The Request DK_Employee Payroll Input Replication operation 223a is included in a DK_Employee Payroll Input Replication Out interface 224a.

A Maintain NL_Employee Payroll Input based on Social Insurance Arrangement operation 225a (FIG. 2K) can send a notification to maintain information on an employee's Dutch social insurance arrangement using a Maintain NL_Employee Payroll Input Status based on Employer Regulatory Compliance asynchronous inbound process agent 228a to update the NL_Employee Payroll Input business object 132. For example, the operation 225a can send a notification to update the NL_Employee Payroll Input business object 132 if input is received from the NL_Employer Regulatory Compliance process component 216.

A Maintain NL_Employee Payroll Input based on Tax Arrangement operation 226a can send a notification to maintain information on an employee's Dutch tax arrangement using the Maintain NL_Employee Payroll Input Status based on Employer Regulatory Compliance asynchronous inbound process agent 228a to update the NL_Employee Payroll Input business object 132. For example, the operation 226a can send a notification to update the NL_Employee Payroll Input business object 132 if input is received from the NL_Employer Regulatory Compliance process component 216. The Maintain NL_Employee Payroll Input based on Social Insurance Arrangement operation 225a and the Maintain NL_Employee Payroll Input based on Tax Arrangement operation 226a are included in a NL_Employer Regulatory Compliance in Payroll Input Maintenance In interface 227a.

A Maintain NL_Employee Payroll Input Status operation 229a can send a notification to maintain information on the status of the NL_Employee Payroll Input business object 132 using a Maintain NL_Employee Payroll Input Status based on Employer Regulatory Compliance asynchronous inbound process agent 231a to update the NL_Employee Payroll Input business object 132. For example, the operation 229a can send a notification to update the NL_Employee Payroll Input business object 132 if input is received from the Payroll Processing at Provider process component 207 (FIG. 2Q). The Maintain NL_Employee Payroll Input Status operation 229a is included in an NL_Employee Payroll Input Replication In interface 230a.

The NL_Employee Payroll Input business object 132 can receive updated information and send the update into other components to perform further operations. As shown in FIG. 2K, outbound process agents can receive information from the NL_Employee Payroll Input business object 132. The NL_Employee Payroll Input business object 132 can be a summary of all employee-specific input for Dutch payroll for one employee.

A Request Collection Replication from NL_Employee Payroll Input to Payroll Processing at Provider asynchronous outbound process agent 202b can invoke a Request NL_Employee Payroll Input Collection Replication operation 299a. For example, the outbound process agent 202b can request replication of a collection of NL_Employee Payroll Input business object 132 instances to a payroll provider by sending input to the Payroll Processing at Provider process component 207 (FIG. 2Q). The Request NL_Employee Payroll Input Collection Replication operation 299a is included in an NL_Employee Payroll Input Collection Replication Out interface 201b.

A Request Replication from NL_Employee Payroll Input to Payroll Processing at Provider asynchronous outbound process agent 232a can invoke a Request NL_Employee Payroll Input Replication operation 233a. For example, the outbound process agent 232a can request replication of the NL_Employee Payroll Input business object 132 to a payroll provider by sending input to the Payroll Processing at Provider process component 207 (FIG. 2Q). The Request NL_Employee Payroll Input Replication operation 233a is included in an NL_Employee Payroll Input Replication Out interface 234a.

A Maintain SG_Employee Payroll Input based on Social Insurance Arrangement operation 235a (FIG. 2L) can send a notification to maintain information on an employee's Singaporean social insurance arrangement using a Maintain SG_Employee Payroll Input based on Employer Regulatory Compliance asynchronous inbound process agent 238a to update the SG_Employee Payroll Input business object 134. For example, the operation 235a can send a notification to update the SG_Employee Payroll Input business object 134 if input is received from the SG_Employer Regulatory Compliance process component 217.

A Maintain SG_Employee Payroll Input based on Tax Arrangement operation 236a can send a notification to maintain information on an employee's Singaporean tax arrangement using the Maintain SG_Employee Payroll Input based on Employer Regulatory Compliance asynchronous inbound process agent 238a to update the SG_Employee Payroll Input business object 134. For example, the operation 236a can send a notification to update the SG_Employee Payroll Input business object 134 if input is received from the SG_Employer Regulatory Compliance process component 217. The Maintain SG_Employee Payroll Input based on Social Insurance Arrangement operation 235a and the Maintain SG_Employee Payroll Input based on Tax Arrangement operation 236a are included in an SG_Employer Regulatory Compliance in Payroll Input Maintenance In interface 237a.

A Maintain SG_Employee Payroll Input Status operation 239a can send a notification to maintain information on the status of the SG_Employee Payroll Input business object 134 using a Maintain SG_Employee Payroll Input Status based on Replication Confirmation asynchronous inbound process agent 241a to update the SG_Employee Payroll Input business object 134. For example, the operation 239a can send a notification to update the SG_Employee Payroll Input business object 134 if input is received from the Payroll Processing at Provider process component 207. The Maintain SG_Employee Payroll Input Status operation 239a is included in an SG_Employee Payroll Input Replication In interface 240a.

The SG_Employee Payroll Input business object 134 can receive updated information and send the update into other components to perform further operations. As shown in FIG. 2L, outbound process agents can receive information from the SG_Employee Payroll Input business object 134. The SG_Employee Payroll Input business object 134 can be a summary of all employee-specific input for Singaporean payroll for one employee.

A Request Collection Replication from SG_Employee Payroll Input to Payroll Processing at Provider asynchronous outbound process agent 205b can invoke a Request SG_Employee Payroll Input Collection Replication operation 203b. For example, the outbound process agent 205b can request replication of a collection of SG_Employee Payroll Input business object 134 instances to a payroll provider by sending input to the Payroll Processing at Provider process component 207 (FIG. 2Q). The Request SG_Employee Payroll Input Collection Replication operation 203b is included in an SG_Employee Payroll Input Collection Replication Out interface 204b.

A Request Replication from SG_Employee Payroll Input to Payroll Processing at Provider asynchronous outbound process agent 242a can invoke a Request SG_Employee Payroll Input Replication operation 243a. For example, the outbound process agent 242a can request replication of the SG_Employee Payroll Input business object 134 to a payroll provider by sending input to the Payroll Processing at Provider process component 207 (FIG. 2Q). The Request SG_Employee Payroll Input Replication operation 243a is included in an SG_Employee Payroll Input Replication Out interface 244a.

A Maintain ZA_Employee Payroll Input based on Social Insurance Arrangement operation 245a (FIG. 2M) can send a notification to maintain information on an employee's South African social insurance arrangement using a Maintain ZA_Employee Payroll Input based on Employer Regulatory Compliance asynchronous inbound process agent 248a to update the ZA_Employee Payroll Input business object 136. For example, the operation 245a can send a notification to update the ZA_Employee Payroll Input business object 136 if input is received from the ZA_Employer Regulatory Compliance process component 218.

A Maintain ZA_Employee Payroll Input based on Tax Arrangement operation 246a can send a notification to maintain information on an employee's South African tax arrangement using the Maintain ZA_Employee Payroll Input based on Employer Regulatory Compliance asynchronous inbound process agent 248a to update the ZA_Employee Payroll Input business object 136. For example, the operation 246a can send a notification to update the ZA_Employee Payroll Input business object 136 if input is received from the ZA_Employer Regulatory Compliance process component 218. The Maintain ZA_Employee Payroll Input based on Social Insurance Arrangement operation 245a and the Maintain ZA_Employee Payroll Input based on Tax Arrangement operation 246a are included in a ZA_Employer Regulatory Compliance in Payroll Input Maintenance In interface 247a.

A Maintain ZA_Employee Payroll Input Status operation 249a can send a notification to maintain information on the status of the ZA_Employee Payroll Input business object 136 using a Maintain ZA_Employee Payroll Input Status based on Replication Confirmation asynchronous inbound process agent 251a to update the ZA_Employee Payroll Input business object 136. For example, the operation 249a can send a notification to update the ZA_Employee Payroll Input business object 136 if input is received from the Payroll Processing at Provider process component 207. The Maintain ZA_Employee Payroll Input Status operation 249a is included in a ZA_Employee Payroll Input Replication In interface 250a.

The ZA_Employee Payroll Input business object 136 can receive updated information and send the update into other components to perform further operations. As shown in FIG. 2M, outbound process agents can receive information from the ZA_Employee Payroll Input business object 136. The ZA_Employee Payroll Input business object 136 can be a summary of all employee-specific input for South African payroll for one employee.

A Request Collection Replication from ZA_Employee Payroll Input to Payroll Processing at Provider asynchronous outbound process agent 208b can invoke a Request ZA_Employee Payroll Input Collection Replication operation 206b. For example, the outbound process agent 208b can request replication of a collection of ZA_Employee Payroll Input business object 136 instances to a payroll provider by sending input to the Payroll Processing at Provider process component 207 (FIG. 2Q). The Request ZA_Employee Payroll Input Collection Replication operation 206b is included in a ZA_Employee Payroll Input Collection Replication Out interface 207b.

A Request Replication from ZA_Employee Payroll Input to Payroll Processing at Provider asynchronous outbound process agent 252a can invoke a Request ZA_Employee Payroll Input Replication operation 253a. For example, the outbound process agent 252a can request replication of the ZA_Employee Payroll Input business object 136 to a payroll provider by sending input to the Payroll Processing at Provider process component 207 (FIG. 2Q). The Request ZA_Employee Payroll Input Replication operation 253a is included in a ZA_Employee Payroll Input Replication Out interface 254a.

A Maintain AT_Employee Payroll Input based on Social Insurance Arrangement operation 210b (FIG. 2N) can send a notification to maintain information on an employee's Austrian social insurance arrangement using a Maintain AT_Employee Payroll Input based on Employer Regulatory Compliance asynchronous inbound process agent 213b to update the AT_Employee Payroll Input business object 142. For example, the operation 210b can send a notification to update the AT_Employee Payroll Input business object 142 if input is received from the AT_Employer Regulatory Compliance process component 209b.

A Maintain AT_Employee Payroll Input based on Tax Arrangement operation 211b can send a notification to maintain information on an employee's Austrian tax arrangement using the Maintain AT_Employee Payroll Input based on Employer Regulatory Compliance asynchronous inbound process agent 213b to update the AT_Employee Payroll Input business object 142. For example, the operation 211b can send a notification to update the AT_Employee Payroll Input business object 142 if input is received from the AT_Employer Regulatory Compliance process component 209b. The Maintain AT_Employee Payroll Input based on Social Insurance Arrangement operation 210b and the Maintain AT_Employee Payroll Input based on Tax Arrangement operation 211b are included in an AT_Employer Regulatory Compliance in Payroll Input Maintenance In interface 212b.

A Maintain AT_Employee Payroll Input Status operation 214b can send a notification to maintain information on the status of the AT_Employee Payroll Input business object 142 using a Maintain AT_Employee Payroll Input Status based on Replication Confirmation asynchronous inbound process agent 218b to update the AT_Employee Payroll Input business object 142. For example, the operation 214b can send a notification to update the AT_Employee Payroll Input business object 142 if input is received from the Payroll Processing at Provider process component 207 (FIG. 2Q). The Maintain AT_Employee Payroll Input Status operation 214b is included in an AT_Employee Payroll Input Replication In interface 216b.

The AT_Employee Payroll Input business object 142 can receive updated information and send the update into other components to perform further operations. As shown in FIG. 2N, outbound process agents can receive information from the AT_Employee Payroll Input business object 142. The AT_Employee Payroll Input business object 142 can be a summary of all employee-specific input for Austrian payroll for one employee.

A Request Collection Replication from AT_Employee Payroll Input to Payroll Processing at Provider asynchronous outbound process agent 219b can invoke a Request AT_Employee Payroll Input Collection Replication operation 215b. For example, the outbound process agent 219b can request replication of a collection of AT_Employee Payroll Input business object 142 instances to a payroll provider by sending input to the Payroll Processing at Provider process component 207 (FIG. 2Q). The Request AT_Employee Payroll Input Collection Replication operation 215b is included in an AT_Employee Payroll Input Collection Replication Out interface 217b.

A Request Replication from AT_Employee Payroll Input to Payroll Processing at Provider asynchronous outbound process agent 220b can invoke a Request AT_Employee Payroll Input Replication operation 221b. For example, the outbound process agent 220b can request replication of the AT_Employee Payroll Input business object 142 to a payroll provider by sending input to the Payroll Processing at Provider process component 207 (FIG. 2Q). The Request AT_Employee Payroll Input Replication operation 221b is included in an AT_Employee Payroll Input Replication Out interface 222b.

A Maintain CH_Employee Payroll Input based on Social Insurance Arrangement operation 238b (FIG. 20) can send a notification to maintain information on an employee's Swiss social insurance arrangement using a Maintain CH_Employee Payroll Input based on Employer Regulatory Compliance asynchronous inbound process agent 241b to update the CH_Employee Payroll Input business object 144. For example, the operation 238b can send a notification to update the CH_Employee Payroll Input business object 144 if input is received from the CH_Employer Regulatory Compliance process component 237b.

A Maintain CH_Employee Payroll Input based on Tax Arrangement operation 239b can send a notification to maintain information on an employee's Swiss tax arrangement using the Maintain CH_Employee Payroll Input based on Employer Regulatory Compliance asynchronous inbound process agent 241b to update the CH_Employee Payroll Input business object 144. For example, the operation 239b can send a notification to update the CH_Employee Payroll Input business object 144 if input is received from the CH_Employer Regulatory Compliance process component 237b. The Maintain CH_Employee Payroll Input based on Social Insurance Arrangement operation 238b and the Maintain CH_Employee Payroll Input based on Tax Arrangement operation 239b are included in a CH_Employer Regulatory Compliance in Payroll Input Maintenance In interface 240b.

A Maintain CH_Employee Payroll Input Status operation 242b can send a notification to maintain information on the status of the CH_Employee Payroll Input business object 144 using a Maintain CH_Employee Payroll Input Status based on Replication Confirmation asynchronous inbound process agent 246b to update the CH_Employee Payroll Input business object 144. For example, the operation 242b can send a notification to update the CH_Employee Payroll Input business object 144 if input is received from the Payroll Processing at Provider process component 207 (FIG. 2Q). The Maintain CH_Employee Payroll Input Status operation 242b is included in a CH_Employee Payroll Input Replication In interface 244b.

The CH_Employee Payroll Input business object 144 can receive updated information and send the update into other components to perform further operations. As shown in FIG. 20, outbound process agents can receive information from the CH_Employee Payroll Input business object 144. The CH_Employee Payroll Input business object 144 can be a summary of all employee-specific input for Swiss payroll for one employee.

A Request Collection Replication from CH_Employee Payroll Input to Payroll Processing at Provider asynchronous outbound process agent 247b can invoke a Request CH_Employee Payroll Input Collection Replication operation 243b. For example, the outbound process agent 247b can request replication of a collection of CH_Employee Payroll Input business object 144 instances to a payroll provider by sending input to the Payroll Processing at Provider process component 207 (FIG. 2Q). The Request CH_Employee Payroll Input Collection Replication operation 243b is included in a CH_Employee Payroll Input Collection Replication Out interface 245b.

A Request Replication from CH_Employee Payroll Input to Payroll Processing at Provider asynchronous outbound process agent 248b can invoke a Request CH_Employee Payroll Input Replication operation 249b. For example, the outbound process agent 248b can request replication of the CH_Employee Payroll Input business object 144 to a payroll provider by sending input to the Payroll Processing at Provider process component 207 (FIG. 2Q). The Request CH_Employee Payroll Input Replication operation 249b is included in a CH_Employee Payroll Input Replication Out interface 250b.

A Maintain IN_Employee Payroll Input based on Social Insurance Arrangement operation 224b (FIG. 2P) can send a notification to maintain information on an employee's Indian social insurance arrangement using a Maintain IN_Employee Payroll Input based on Employer Regulatory Compliance asynchronous inbound process agent 227b to update the IN_Employee Payroll Input business object 146. For example, the operation 224b can send a notification to update the IN_Employee Payroll Input business object 146 if input is received from the IN_Employer Regulatory Compliance process component 223b.

A Maintain IN_Employee Payroll Input based on Tax Arrangement operation 225b can send a notification to maintain information on an employee's Indian tax arrangement using the Maintain IN_Employee Payroll Input based on Employer Regulatory Compliance asynchronous inbound process agent 227b to update the IN_Employee Payroll Input business object 146. For example, the operation 225b can send a notification to update the IN_Employee Payroll Input business object 146 if input is received from the IN_Employer Regulatory Compliance process component 223b. The Maintain IN_Employee Payroll Input based on Social Insurance Arrangement operation 224b and the Maintain IN_Employee Payroll Input based on Tax Arrangement operation 225b are included in an IN_Employer Regulatory Compliance in Payroll Input Maintenance In interface 226b.

A Maintain IN_Employee Payroll Input Status operation 228b can send a notification to maintain information on the status of the IN_Employee Payroll Input business object 146 using a Maintain IN_Employee Payroll Input Status based on Replication Confirmation asynchronous inbound process agent 232b to update the IN_Employee Payroll Input business object 146. For example, the operation 228b can send a notification to update the IN_Employee Payroll Input business object 146 if input is received from the Payroll Processing at Provider process component 207 (FIG. 2Q). The Maintain IN_Employee Payroll Input Status operation 228b is included in an IN_Employee Payroll Input Replication In interface 230b.

The IN_Employee Payroll Input business object 146 can receive updated information and send the update into other components to perform further operations. As shown in FIG. 2P, outbound process agents can receive information from the IN_Employee Payroll Input business object 146. The IN_Employee Payroll Input business object 146 can be a summary of all employee-specific input for Indian payroll for one employee.

A Notify of IN_Employee Payroll Input Provider Details to Employee Payroll Administration asynchronous outbound process agent 252b can invoke a Notify operation 253b. For example, the outbound process agent 252b can notify the Employee Payroll Administration process component 204 of additions or changes to information about the IN_Employee Payroll Input business object 146 to a payroll provider by sending a notification to the Payroll Processing at Provider process component 207 (FIG. 2Q). The Notify operation 253b is included in an IN_Employee Payroll Input Provider Details Notification Out interface 254b.

A Request Collection Replication from IN_Employee Payroll Input to Payroll Processing at Provider asynchronous outbound process agent 233b can invoke a Request IN_Employee Payroll Input Collection Replication operation 229b. For example, the outbound process agent 233b can request replication of a collection of IN_Employee Payroll Input business object 146 instances to a payroll provider by sending input to the Payroll Processing at Provider process component 207 (FIG. 2Q). The Request IN_Employee Payroll Input Collection Replication operation 229b is included in an IN_Employee Payroll Input Collection Replication Out interface 231b.

A Request Replication from IN_Employee Payroll Input to Payroll Processing at Provider asynchronous outbound process agent 234b can invoke a Request IN_Employee Payroll Input Replication operation 235b. For example, the outbound process agent 234b can request replication of the IN_Employee Payroll Input business object 146 to a payroll provider by sending input to the Payroll Processing at Provider process component 207 (FIG. 2Q). The Request IN_Employee Payroll Input Replication operation 235b is included in an IN_Employee Payroll Input Replication Out interface 236b.

A Maintain Payroll Process operation 255a (FIG. 2Q) can send a notification to the Payroll Process business object 124 that a payroll provider is ready with the setups required for a country-specific payroll run using a Maintain Payroll Process based on Provider Setup asynchronous inbound process agent 257a to update the Payroll Process business object 124. For example, the operation 255a can send a notification to update the Payroll Process business object 124 if input is received from the Payroll Processing at Provider process component 207. The Maintain Payroll Process operation 255a is included in a Payroll Processing Setup In interface 256a.

A Maintain Payroll Input Replication Status operation 266a can send a notification to maintain a payroll input replication status based on a payroll provider confirmation using a Maintain Payroll Process Status and Results asynchronous inbound process agent 271 a to update the Payroll Process business object 124. For example, the operation 266a can send a notification to update the Payroll Process business object 124 if input is received from the Payroll Processing at Provider process component 207.

A Maintain Payroll Process Status based on Execution Confirmation operation 267a can send a notification to maintain a payroll process status based on an execution confirmation from a payroll provider using the asynchronous inbound process agent 271a to update the Payroll Process business object 124. For example, the operation 267a can send a notification to update the Payroll Process business object 124 if input is received from the Payroll Processing at Provider process component 207. The Maintain Payroll Input Replication Status operation 266a and the Maintain Payroll Process Status based on Execution Confirmation operation 267a are included in a Payroll Step Execution Requesting In interface 270a.

The Payroll Process business object 124 can receive updated information and send the update into other components to perform further operations. As shown in FIG. 2Q, outbound process agents can receive information from the Payroll Process business object 124. The Payroll Process business object 124 can be a process that runs the payroll for a group of employees in a payroll period.

A Notify of Payroll Process to Employee Payroll Administration asynchronous outbound process agent 258a can invoke a Notify of Payroll Process Collection operation 261a. For example, the outbound process agent 258a can send a notification of changes in the payroll process to the view of the payroll process in a human capital management deployment unit by sending input to the Employee Payroll Administration process component 204. The Notify of Payroll Process Collection operation 261 a is included in a Payroll Process Employee Payroll Administration Notification Out interface 265a.

A Request Payroll Input Replication from Payroll Processing to Provider asynchronous outbound process agent 259a can invoke a Request Employee Payroll Input Replication operation 262a. For example, the outbound process agent 259a can request the replication of employee payroll input on a payroll group level by sending input to the Payroll Processing at Provider process component 207.

A Request Payroll Step Execution from Payroll Processing to Provider asynchronous outbound process agent 260a can invoke a Request Payroll Step Execution operation 264a. For example, the outbound process agent 260a can request execution of a step in the payroll process from a payroll provider by sending input to the Payroll Processing at Provider process component 207. The Request Employee Payroll Input Replication operation 262a and the Request Payroll Step Execution operation 264a are included in a Payroll Step Execution Requesting Out interface 263a.

The implementation of the Payroll Processing process component 104 is further supported by several business objects, although no operations or process agents involving the business objects are explicitly shown in FIG. 2Q. These business objects are the Payroll Step Execution Run business object 112, the Work Agreement Payroll Input business object 116, the Employee Payroll Input business object 148, and the Employment Payroll Input business object 114. The Payroll Step Execution Run business object 112 represents a specification of an automatic run that executes a payroll process step for a selected group of employees. The Work Agreement Payroll Input business object 116 represents a summary of country-independent payroll input for a work agreement. The Employee Payroll Input business object 148 represents a summary of the country-independent payroll input for an employee. The Employment Payroll Input business object 114 represents a summary of the country-independent payroll input for an employment.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as an exemplification of preferred embodiments of the present disclosure. Certain features that are described in this specification in the context of separate embodiments may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A non-transitory computer readable storage medium including instructions executable by a processor for providing message-based services using a service-oriented methodology for implementing an instance of a payroll deployment unit, the instructions operable when executed by a processor to:

store an instance of the payroll deployment unit for collecting payroll-relevant data from events such as hiring or transfer of an employee, changes to remuneration, time recording, and settlement of expenses, reporting on the collected payroll-relevant data and transferring the collected payroll-relevant data to a financial accounting process, and handling of a payment process to employees, authorities and other payment recipients, where the payroll deployment unit defines the limits of an application-defined transaction for collecting payroll-relevant data from events such as hiring or transfer of an employee, changes to remuneration, time recording, and settlement of expenses, reporting on the payroll results and transferring to financial accounting, and the handling of the payment process to employees, authorities and other payment recipients by a set of actions that have atomicity, consistency, isolation, and durability in a database, and wherein the actions associated with the application-defined transaction are performed by at least one process component contained in the payroll deployment unit, wherein each process component comprises a software package realizing a business process and exposing the process component's functionality as at least one service operation, wherein the payroll deployment unit comprises:

a Maintain Australian (AU)_Employee Payroll Input based on Pension Insurance Arrangement operation, a Maintain AU_Employee Payroll Input based on Tax Arrangement operation, a Maintain AU_Employee Payroll Input Status operation, a Maintain Canadian (CA)_Employee Payroll Input based on Tax Arrangement operation, a Maintain CA_Employee Payroll Input Status operation, a Maintain Switzerland (CH)_Employee Payroll Input based on Social Insurance Arrangement operation, a Maintain CH_Employee Payroll Input based on Tax Arrangement operation, a Maintain CH_Employee Payroll Input Status operation, a Maintain Chinese (CN)_Employee Payroll Input based on Social Insurance Arrangement operation, a Maintain CN_Employee Payroll Input based on Tax Arrangement operation, a Maintain CN_Employee Payroll Input Status operation, a Maintain German (DE)_Employee Payroll Input based on Social Insurance Arrangement operation, a Maintain DE_Employee Payroll Input based on Tax Arrangement operation, a Maintain DE_Employee Payroll Input Status operation, a Maintain Dutch (DK)_Employee Payroll Input based on Social Insurance Arrangement operation, a Maintain DK_Employee Payroll Input based on Tax Arrangement operation, a Maintain DK_Employee Payroll Input Status operation, a Maintain Employee Payroll Input based on Employee Compensation Agreement operation, a Maintain Employee Payroll Input based on Employee Payroll Agreement operation, a Maintain Employee Payroll Input based on Employee Time Account operation, a Maintain Employee Payroll Input based on Employee Time Calendar operation, a Maintain Employee Payroll Input based on Planned Working Times operation, a Maintain Employee Payroll Input based on Settlement Result operation, a Maintain Employee Payroll Input based on Settlement Result Cancellation operation, a Maintain French (FR)_Employee Payroll Input based on Employee Social Insurance Arrangement operation, a Maintain FR_Employee Payroll Input Status operation, a Maintain Great Britain (GB)_Employee Payroll Input based on Social Insurance Arrangement operation, a Maintain GB_Employee Payroll Input based on Tax Arrangement operation, a Maintain GB_Employee Payroll Input Status operation, a Maintain Indian (IN)_Employee Payroll Input based on Social Insurance Arrangement operation, a Maintain IN_Employee Payroll Input based on Tax Arrangement operation, a Maintain IN_Employee Payroll Input Status operation, a Maintain Italian (IT)_Employee Payroll Input based on Social Insurance Arrangement operation, a Maintain IT_Employee Payroll Input based on Tax Arrangement operation, a Maintain IT_Employee Payroll Input Status operation, a Maintain Netherlands (NL)_Employee Payroll Input based on Social Insurance Arrangement operation, a Maintain NL_Employee Payroll Input based on Tax Arrangement operation, a Maintain NL_Employee Payroll Input Status operation, a Maintain Payroll Input Replication Status operation, a Maintain Payroll Process operation, a Maintain Payroll Process Status based on Execution Confirmation operation, a Maintain Singapore (SG)_Employee Payroll Input based on Social Insurance Arrangement operation, a Maintain SG_Employee Payroll Input based on Tax Arrangement operation, a Maintain SG_Employee Payroll Input Status operation, a Maintain United States (US)_Employee Payroll Input based on Tax Arrangement operation, a Maintain US_Employee Payroll Input Status operation, a Maintain South Africa (ZA)_Employee Payroll Input based on Social Insurance Arrangement operation, a Maintain ZA_Employee Payroll Input based on Tax Arrangement operation, a Maintain ZA_Employee Payroll Input Status operation, a first Notify operation, a second Notify operation, a third Notify operation, a fourth Notify operation, a fifth Notify operation, a sixth Notify operation, a Notify of Payroll Process Collection operation, a Request Austrian (AT) _Employee Payroll Input Collection Replication operation, a Request AT_Employee Payroll Input Replication operation, a Request AU_Employee Payroll Input Collection Replication operation, a Request AU_Employee Payroll Input Replication operation, a Request CA_Employee Payroll Input Collection Replication operation, a Request CA_Employee Payroll Input Replication operation, a Request CH_Employee Payroll Input Collection Replication operation, a Request CH_Employee Payroll Input Replication operation, a Request CN_Employee Payroll Input Collection Replication operation, a Request CN_Employee Payroll Input Replication operation, a Request DE_Employee Payroll Input Collection Replication operation, a Request DE_Employee Payroll Input Replication operation, a Request DK_Employee Payroll Input Collection Replication operation, a Request DK_Employee Payroll Input Replication operation, a Request Employee Payroll Input Replication operation, a Request FR_Employee Payroll Input Collection Replication operation, a Request FR_Employee Payroll Input Replication operation, a Request GB_Employee Payroll Input Collection Replication operation, a Request GB_Employee Payroll Input Replication operation, a Request IN_Employee Payroll Input Collection Replication operation, a Request IN_Employee Payroll Input Replication operation, a Request IT_Employee Payroll Input Collection Replication operation, a Request IT_Employee Payroll Input Replication operation, a Request NL_Employee Payroll Input Collection Replication operation, a Request NL_Employee Payroll Input Replication operation, a Request Payroll Step Execution operation, a Request SG_Employee Payroll Input Collection Replication operation, a Request SG_Employee Payroll Input Replication operation, a Request US_Employee Payroll Input Collection Replication operation, a Request US_Employee Payroll Input Replication operation, a Request ZA_Employee Payroll Input Collection Replication operation, and a Request ZA_Employee Payroll Input Replication operation;

wherein the service operations of the payroll deployment unit are packaged together to be deployed on a single computer system;

execute the application-defined transaction for collecting payroll-relevant data from events such as hiring or transfer of an employee, changes to remuneration, time recording, and settlement of expenses, reporting on the payroll results and transfer to financial accounting, and the handling of the payment process to employees, authorities and other payment recipients; and present data associated with the executed application-defined transaction for collecting payroll-relevant data from events such as hiring or transfer of an employee, changes to remuneration, time recording, and settlement of expenses, reporting on the payroll results and transfer to financial accounting, and the handling of the payment process to employees, authorities and other payment recipients to a graphical user interface.

2. The medium of claim 1, wherein the payroll deployment unit further comprises a payroll processing process component.

3. The medium of claim 2, wherein the payroll processing process component implements the request AT_employee payroll input collection replication operation, the request AT_employee payroll input replication operation, the maintain AU_employee payroll input based on pension insurance arrangement operation, the maintain AU_employee payroll input based on tax arrangement operation, the request AU_employee payroll input collection replication operation, the maintain AU_employee payroll input status operation, the request AU_employee payroll input replication operation, the maintain CA_employee payroll input based on tax arrangement operation, the request CA_employee payroll input collection replication operation, the maintain CA_employee payroll input status operation, the request CA_employee payroll input replication operation, the maintain CH_employee payroll input based on social insurance arrangement operation, the maintain CH_employee payroll input based on tax arrangement operation, the request CH_employee payroll input collection replication operation, the maintain CH_employee payroll input status operation, the request CH_employee payroll input replication operation, the maintain CN_employee payroll input based on social insurance arrangement operation, the maintain CN_employee payroll input based on tax arrangement operation, the request CN_employee payroll input collection replication operation, the first notify operation, the maintain CN_employee payroll input status operation, the request CN_employee payroll input replication operation, the maintain DE_employee payroll input based on social insurance arrangement operation, the maintain DE_employee payroll input based on tax arrangement operation, the request DE_employee payroll input collection replication operation, the second notify operation, the maintain DE_employee payroll input status operation, the request DE_employee payroll input replication operation, the maintain DK employee payroll input based on social insurance arrangement operation, the maintain DK_employee payroll input based on tax arrangement operation, the request DK_employee payroll input collection replication operation, the maintain DK_employee payroll input status operation, the request DK_employee payroll input replication operation, the maintain employee payroll input based on employee compensation agreement operation, the maintain employee payroll input based on employee payroll agreement operation, the maintain employee payroll input based on planned working times operation, the maintain employee payroll input based on employee time account operation, the maintain employee payroll input based on employee time calendar operation, the maintain employee payroll input based on settlement result operation, the maintain employee payroll input based on settlement result cancellation operation, the maintain FR_employee payroll input based on employee social insurance arrangement operation, the request FR_employee payroll input collection replication operation, the third notify operation, the maintain FR_employee payroll input status operation, the request FR_employee payroll input replication operation, the maintain GB_employee payroll input based on social insurance arrangement operation, the maintain GB_employee payroll input based on tax arrangement operation, the request GB_employee payroll input collection replication operation, the fourth notify operation, the maintain GB_employee payroll input status operation, the request GB_employee payroll input replication operation, the maintain IN_employee payroll input based on social insurance arrangement operation, the maintain IN_employee payroll input based on tax arrangement operation, the request IN_employee payroll input collection replication operation, the fifth notify operation, the maintain IN_employee payroll input status operation, the request IN_employee payroll input replication operation, the maintain IT_employee payroll input based on social insurance arrangement operation, the maintain IT_employee payroll input based on tax arrangement operation, the request IT_employee payroll input collection replication operation, the maintain IT_employee payroll input status operation, the request IT_employee payroll input replication operation, the maintain NL_employee payroll input based on social insurance arrangement operation, the maintain NL_employee payroll input based on tax arrangement operation, the request NL_employee payroll input collection replication operation, the maintain NL_employee payroll input status operation, the request NL_employee payroll input replication operation, the notify of payroll process collection operation, the maintain payroll process operation, the maintain payroll input replication status operation, the maintain payroll process status based on execution confirmation operation, the request employee payroll input replication operation, the request payroll step execution operation, the maintain SG_employee payroll input based on social insurance arrangement operation, the maintain SG_employee payroll input based on tax arrangement operation, the request SG_employee payroll input collection replication operation, the maintain SG_employee payroll input status operation, the request SG_employee payroll input replication operation, the maintain US_employee payroll input based on tax arrangement operation, the request US_employee payroll input collection replication operation, the sixth notify operation, the maintain US_employee payroll input status operation, the request US_employee payroll input replication operation, the maintain ZA_employee payroll input based on social insurance arrangement operation, the maintain ZA_employee payroll input based on tax arrangement operation, the request ZA_employee payroll input collection replication operation, the maintain ZA_employee payroll input status operation, and the request ZA_employee payroll input replication operation.

4. The medium of claim 2, wherein the payroll processing process component comprises an AT_employee payroll input business object, an AU_employee payroll input business object, a CA_employee payroll input business object, a CH_employee payroll input business object, a CN_employee payroll input business object, a DE_employee payroll input business object, a DK_employee payroll input business object, an employee payroll input business object, an employment payroll input business object, an FR_employee payroll input business object, a GB_employee payroll input business object, an IN_employee payroll input business object, an IT_employee payroll input business object, an NL_employee payroll input business object, a payroll process business object, a payroll step execution run business object, an SG_employee payroll input business object, a US_employee payroll input business object, a work agreement payroll input business object, and a ZA_employee payroll input business object.

5. The medium of claim 1, wherein the service operations are grouped into service interfaces, the service interfaces comprising:

an AT_employee payroll input collection replication out interface that includes the request AT_employee payroll input collection replication operation;

an AT_employee payroll input replication out interface that includes the request AT_employee payroll input replication operation;

an AU_employer regulatory compliance in payroll input maintenance in interface that includes the maintain AU_employee payroll input based on pension insurance arrangement and the maintain AU_employee payroll input based on tax arrangement operations;

an AU_employee payroll input collection replication out interface that includes the request AU_employee payroll input collection replication operation;

an AU_employee payroll input replication in interface that includes the maintain AU_employee payroll input status operation;

an AU_employee payroll input replication out interface that includes the request AU_employee payroll input replication operation;

a CA_employer regulatory compliance in payroll input maintenance in interface that includes the maintain CA_employee payroll input based on tax arrangement operation;

a CA_employee payroll input collection replication out interface that includes the request CA_employee payroll input collection replication operation;

a CA_employee payroll input replication in interface that includes the maintain CA_employee payroll input status operation;

a CA_employee payroll input replication out interface that includes the request CA_employee payroll input replication operation;

a CH_employer regulatory compliance in payroll input maintenance in interface that includes the maintain CH_employee payroll input based on social insurance arrangement and the maintain CH_employee payroll input based on tax arrangement operations;

a CH_employee payroll input collection replication out interface that includes the request CH_employee payroll input collection replication operation;

a CH_employee payroll input replication in interface that includes the maintain CH_employee payroll input status;

a CH_employee payroll input replication out interface that includes the request CH_employee payroll input replication operation;

a CN_employer regulatory compliance in payroll input maintenance in interface that includes the maintain CN_employee payroll input based on social insurance arrangement and the maintain CN_employee payroll input based on tax arrangement operations;

a CN_employee payroll input collection replication out interface that includes the request CN_employee payroll input collection replication operation;

a CN_employee payroll input provider details notification out interface that includes the first notify operation;

a CN_employee payroll input replication in interface that includes the maintain CN_employee payroll input status operation;

a CN_employee payroll input replication out interface that includes the request CN_employee payroll input replication operation;

a DE_employer regulatory compliance in payroll input maintenance in interface that includes the maintain DE_employee payroll input based on social insurance arrangement and the maintain DE_employee payroll input based on tax arrangement operations;

a DE_employee payroll input collection replication out interface that includes the request DE_employee payroll input collection replication operation;

a DE_employee payroll input provider details notification out interface that includes the second notify operation;

a DE_employee payroll input replication in interface that includes the maintain DE_employee payroll input status operation;

a DE_employee payroll input replication out interface that includes the request DE_employee payroll input replication operation;

a DK_employer regulatory compliance in payroll input maintenance in interface that includes the maintain DK_employee payroll input based on social insurance arrangement and the maintain DK_employee payroll input based on tax arrangement operations;

a DK_employee payroll input collection replication out interface that includes the request DK_employee payroll input collection replication operation;

a DK_employee payroll input replication in interface that includes the maintain DK_employee payroll input status operation;

a DK_employee payroll input replication out interface that includes the request DK_employee payroll input replication operation;

an employee compensation agreement in payroll input maintenance in interface that includes the maintain employee payroll input based on employee compensation agreement operation;

an employee payroll agreement in payroll input maintenance in interface that includes the maintain employee payroll input based on employee payroll agreement operation;

an employee time agreement in payroll input maintenance in interface that includes the maintain employee payroll input based on planned working times operation;

an employee time calendar and account in payroll input maintenance in interface that includes the maintain employee payroll input based on employee time account and the maintain employee payroll input based on employee time calendar operations;

an expense report in payroll input maintenance in interface that includes the maintain employee payroll input based on settlement result and the maintain employee payroll input based on settlement result cancellation operations;

an FR_employer regulatory compliance in payroll input maintenance in interface that includes the maintain FR_employee payroll input based on employee social insurance arrangement operation;

an FR_employee payroll input collection replication out interface that includes the request FR_employee payroll input collection replication operation;

an FR_employee payroll input provider details notification out interface that includes the third notify operation;

an FR_employee payroll input replication in interface that includes the maintain FR_employee payroll input status operation;

an FR_employee payroll input replication out interface that includes the request FR_employee payroll input replication operation;

a GB_employer regulatory compliance in payroll input maintenance in interface that includes the maintain GB_employee payroll input based on social insurance arrangement and the maintain GB_employee payroll input based on tax arrangement operations;

a GB_employee payroll input collection replication out interface that includes the request GB_employee payroll input collection replication operation;

a GB_employee payroll input provider details notification out interface that includes the fourth notify operation;

a GB_employee payroll input replication in interface that includes the maintain GB_employee payroll input status operation;

a GB_employee payroll input replication out interface that includes the request GB_employee payroll input replication operation;

an IN_employer regulatory compliance in payroll input maintenance in interface that includes the maintain IN_employee payroll input based on social insurance arrangement and the maintain IN_employee payroll input based on tax arrangement operations;

an IN_employee payroll input collection replication out interface that includes the request IN_employee payroll input collection replication operation;

an IN_employee payroll input provider details notification out interface that includes the fifth notify operation;

an IN_employee payroll input replication in interface that includes the maintain IN_employee payroll input status operation;

an IN_employee payroll input replication out interface that includes the request IN_employee payroll input replication operation;

an IT_employer regulatory compliance in payroll input maintenance in interface that includes the maintain IT_employee payroll input based on social insurance arrangement and the maintain IT_employee payroll input based on tax arrangement operations;

an IT_employee payroll input collection replication out interface that includes the request IT_employee payroll input collection replication operation;

an IT_employee payroll input replication in interface that includes the maintain IT_employee payroll input status operation;

an IT_employee payroll input replication out interface that includes the request IT_employee payroll input replication operation;

an NL_employer regulatory compliance in payroll input maintenance in interface that includes the maintain NL_employee payroll input based on social insurance arrangement and the maintain NL_employee payroll input based on tax arrangement operations;

an NL_employee payroll input collection replication out interface that includes the request NL_employee payroll input collection replication operation;

an NL_employee payroll input replication in interface that includes the maintain NL_employee payroll input status operation;

an NL_employee payroll input replication out interface that includes the request NL_employee payroll input replication operation;

a payroll process employee payroll administration notification out interface that includes the notify of payroll process collection operation;

a payroll processing setup in interface that includes the maintain payroll process operation;

a payroll step execution requesting in interface that includes the maintain payroll input replication status and the maintain payroll process status based on execution confirmation operations;

a payroll step execution requesting out interface that includes the request employee payroll input replication and the request payroll step execution operations;

an SG_employer regulatory compliance in payroll input maintenance in interface that includes the maintain SG_employee payroll input based on social insurance arrangement and the maintain SG_employee payroll input based on tax arrangement operations;

an SG_employee payroll input collection replication out interface that includes the request SG_employee payroll input collection replication operation;

an SG_employee payroll input replication in interface that includes the maintain SG_employee payroll input status operation;

an SG_employee payroll input replication out interface that includes the request SG_employee payroll input replication operation;

a US_employer regulatory compliance in payroll input maintenance in interface that includes the maintain US_employee payroll input based on tax arrangement operation;

a US_employee payroll input collection replication out interface that includes the request US_employee payroll input collection replication operation;

a US_employee payroll input provider details notification out interface that includes the sixth notify operation;

a US_employee payroll input replication in interface that includes the maintain US_employee payroll input status operation;

a US_employee payroll input replication out interface that includes the request US_employee payroll input replication operation;

a ZA_employer regulatory compliance in payroll input maintenance in interface that includes the maintain ZA_employee payroll input based on social insurance arrangement and the maintain ZA_employee payroll input based on tax arrangement operations;

a ZA_employee payroll input collection replication out interface that includes the request ZA_employee payroll input collection replication operation;

a ZA_employee payroll input replication in interface that includes the maintain ZA_employee payroll input status operation; and a ZA_employee payroll input replication out interface that includes the request ZA_employee payroll input replication operation.

6. The medium of claim 1, wherein the single computer system comprises a single physical hardware platform.

* * * * *